(12) United States Patent
Lin et al.

(10) Patent No.: US 9,178,688 B2
(45) Date of Patent: Nov. 3, 2015

(54) RECEIVER WITH CLOCK RECOVERY CIRCUIT AND ADAPTIVE SAMPLE AND EQUALIZER TIMING

(71) Applicant: Rambus Inc., Sunnyvale, CA (US)

(72) Inventors: Qi Lin, Los Altos, CA (US); Brian Leibowitz, San Francisco, CA (US); Hae-Chang Lee, Los Altos, CA (US); Jihong Ren, Sunnyvale, CA (US); Kyung Suk Oh, Cupertino, CA (US); Jared L. Zerbe, Woodside, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/014,047

(22) Filed: Aug. 29, 2013

(65) Prior Publication Data
US 2014/0169438 A1 Jun. 19, 2014

Related U.S. Application Data

(63) Continuation of application No. 12/523,042, filed as application No. PCT/US2007/025634 on Dec. 13, 2007, now Pat. No. 8,548,110.

(60) Provisional application No. 60/879,767, filed on Jan. 9, 2007.

(51) Int. Cl.
*H03K 5/159* (2006.01)
*H04L 7/033* (2006.01)
(Continued)

(52) U.S. Cl.
CPC ............ *H04L 7/0331* (2013.01); *H04L 7/0025* (2013.01); *H04L 25/03057* (2013.01);
(Continued)

(58) Field of Classification Search
CPC ......... H04L 7/0025; H04L 27/01; H04L 1/20; H04L 25/0292; H04L 1/203; H04L 25/03057; H04L 7/033; H04L 2025/0349; H04L 2025/03636; H04L 25/03885; H04L 7/0037; H04L 25/03146; H04L 7/0079; H03L 7/087
USPC .......... 375/232, 233, 350, 340, 316, 355, 229
See application file for complete search history.

(56) References Cited

U.S. PATENT DOCUMENTS 4,667,333 A * 5/1987 Butcher .................... 375/355
4,789,994 A  12/1988 Randall et al.
(Continued)

FOREIGN PATENT DOCUMENTS

EP  0476487 A2  3/1992
EP  1545045 A2  6/2005

OTHER PUBLICATIONS

Aoyama, Morishige et al., 3Gbps, 5000ppm Spread Spectrum SerDes PHY with Frequency Tracking Phase Interpolator for Serial ATA, NEC Electronics Corporation, 2003 Symposium on VLSI Circuits Digest of Technical Papers. 4 Pages.

(Continued)

*Primary Examiner* — Leila Malek
(74) *Attorney, Agent, or Firm* — Silicon Edge Law Group LLP; Arthur J. Behiel

(57) ABSTRACT

A receiver is equipped with an adaptive phase-offset controller and associated timing-calibration circuitry that together shift the timing for a data sampler and a digital equalizer. The sample and equalizer timing is shifted to a position with less residual inter-symbol interference (ISI) energy relative to the current symbol. The shifted position may be calculated using a measure of signal quality, such as a receiver bit-error rate or a comparison of filter-tap values, to optimize the timing of data recovery.

19 Claims, 15 Drawing Sheets

(51) Int. Cl.
*H04L 7/00* (2006.01)
*H04L 25/03* (2006.01)

(52) U.S. Cl.
CPC .... *H04L25/03254* (2013.01); *H04L 25/03885* (2013.01); *H04L 7/0054* (2013.01); *H04L 7/033* (2013.01); *H04L 2025/03617* (2013.01)

(56) References Cited

U.S. PATENT DOCUMENTS

| | | | |
|---|---|---|---|
| 5,896,391 | A | 4/1999 | Solheim et al. |
| 6,968,480 | B1 | 11/2005 | Yuan et al. |
| 7,058,150 | B2 | 6/2006 | Buchwald et al. |
| 7,471,691 | B2 | 12/2008 | Black et al. |
| 8,311,176 | B2 | 11/2012 | Lee et al. |
| 8,331,512 | B2 | 12/2012 | Lee et al. |
| 2001/0019581 | A1* | 9/2001 | Agazzi .......... 375/220 |
| 2002/0110215 | A1* | 8/2002 | Hendrickson ..... 375/376 |
| 2003/0123572 | A1 | 7/2003 | Samueli et al. |
| 2004/0061539 | A1 | 4/2004 | Joordens et al. |
| 2005/0135471 | A1 | 6/2005 | Tonietto et al. |
| 2005/0135475 | A1 | 6/2005 | Momtaz et al. |
| 2005/0135510 | A1 | 6/2005 | Momtaz |
| 2005/0271137 | A1* | 12/2005 | Kolze et al. ......... 375/233 |
| 2006/0188043 | A1 | 8/2006 | Zerbe et al. |

OTHER PUBLICATIONS

Casas, Raul A. et al., "DFE Tutorial." Jul. 14, 1998. Slides 1-29.
CN First Office Action dated Apr. 1, 2012 re CN Application No. 200780049526.7. 11 pages.
EP Examination Report dated Feb. 28, 2013 in EP Application No. 07 853 389.0. 7 pages.
EP Office Communication pursuant to Article 94(3) EPC with mail date of Aug. 23, 2010 for Application No. 07853389.0-2415. 5 pages.
EP Office Communication pursuant to Article 94(3) EPC with mail date of Nov. 8, 2011 for Application No. 07853389.0. 7 Pages.
EP Response dated Dec. 29, 2010 to the Official Communication dated Aug. 23, 2010 re EP Application No. 07853389.0. 38 Pages.
EP Response dated Jun. 24, 2013 in EP Application No. 07853389.0, Includes New Claims (Clear and Highlighted copies) and New Description pp. 3, 20, 21, and 23. 16 pages.
EP Response dated May 15, 2012 re EP Application No. 07853389.0, includes new claims (highlighted and clear copy). 15 pages.
Farjad-Rad et al., "0.622-8 Gbps 150mW Serial IO Macrocell with Fully Flexible Preemphasis and Equalization," Symposium on VLSI Circuits Digest of Technical Papers, Jun. 2003. 4 pages.
International Preliminary Report on Patentability (Chapter II) with mail date of Mar. 21, 2011 re International Application No. PCT/US07/25634. 6 pages.
K.-Y. K. Chang et al., "A 0.4-4GB/s CMOS Quad Transceiver Cell Using on-chip regulated Dual-Loop PLLs", IEEE Journal of solid state circuits, vol. 38, No. 5, May 2003.
Lee et al., "Paper 18.4: Improving CDR Performance via Estimation," 2006 IEEE International Solid-State Circuits Conference, Feb. 7, 2006. 8 pages.
Lee, Hae-Chang et al., "Burst Mode Packet Receiver Using a Second Order DLL", 2004 Symposium on VLSI Circuits Digest of Technical Papers. 4 Pages.
Lee, Hae-Chang, "An Estimation Approach to Clock and Data Recovery", Nov. 2006, Thesis, Department of Electrical Engineering of Stanford University. 122 Pages.
Lee, M.J. Edward et al., "A Second-Order Semi-Digital Clock Recovery Circuit Based on Injection Locking", ISSCC 2003 Session 4, Clock Recovery and Backplane Transceivers Paper 4.3. 8 Pages.
Lin, Qi, U.S. Appl. No. 12/523,042, filed Jul. 13, 2009, Office Action mailed Jan. 4, 2012. 13 pages.
Lin, Qi, U.S. Appl. No. 12/523,042, filed Jul. 13, 2009, Response dated May 4, 2012 to the Office Action mailed Jan. 4, 2012. 11 pages.
Notification of Transmittal of the International Search Report and Written Opinion of the Int'l Searching Authority for PCT/US2007/025634 dated Apr. 15, 2008, 12 pages.
Sidiropoulos, Stefanos et al., "A Semidigital Dual Delay-Locked Loop", IEEE Journal of Solid-State Circuits, vol. 32, No. 11, Nov. 1997, ppl 1683-1692 10 Pages.
Stojanovic et al., "Modeling and Analysis of High-Speed Links". Research supported by the MARCO Interconnect Focus Center and Rambus, Inc.; Sep. 21, 2003. 8 pages.
Zerbe et al., "Comparison of Adaptive and Non-Adaptive Equalization Methods in High-Performance Backplanes," dated 2005, DegignCon 2005. 17 pages.
Zerbe, Jared et al., "Equalization and Clock Recovery for a 2.5-10-Gb/s 2-PAM/4-PAM Backplane Transceiver Cell." IEEE Journal of Solid-State Circuits, vol. 38, No. 12, Dec. 2003. 10 Pages.

\* cited by examiner

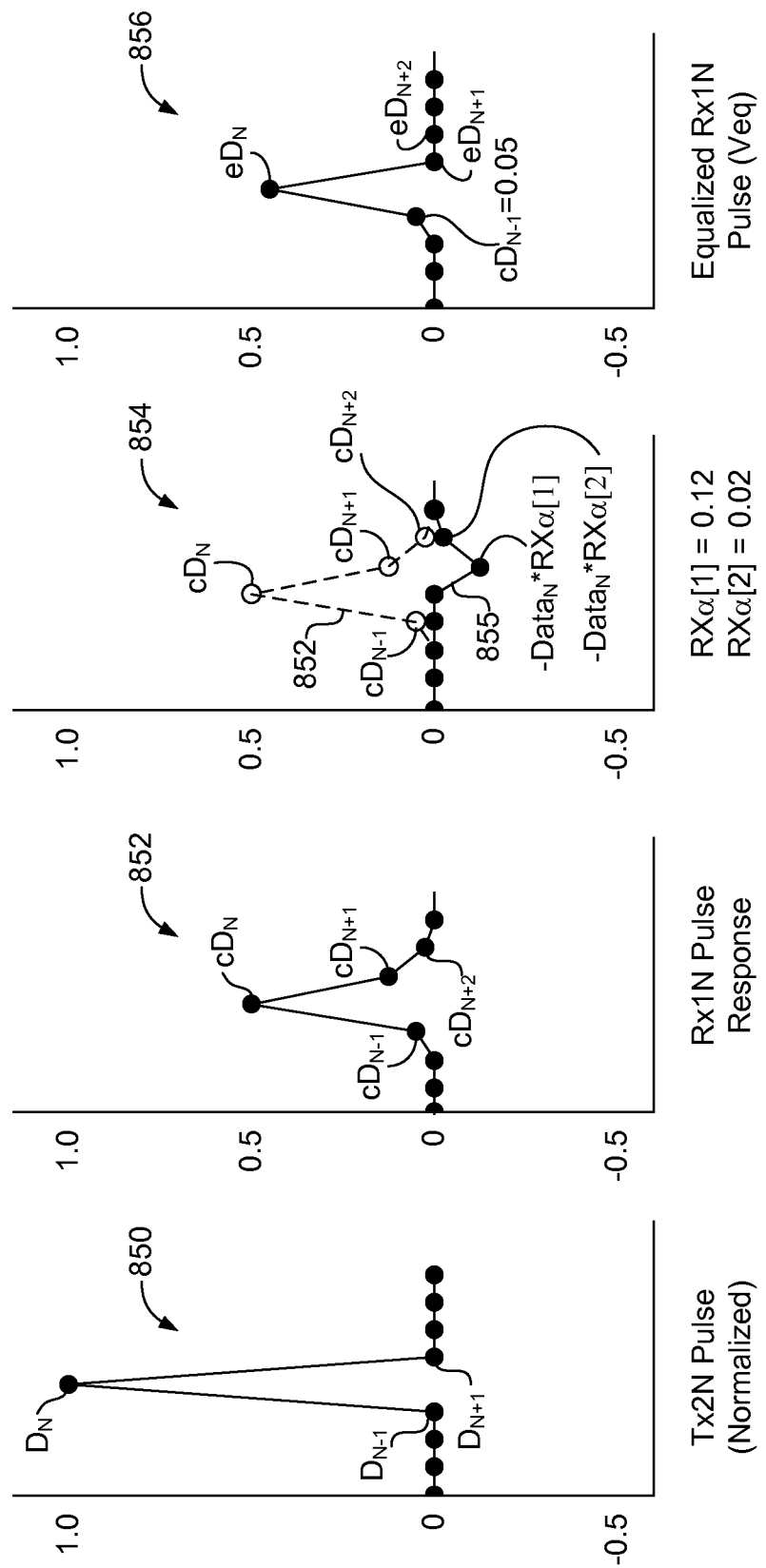

RECEIVER WITH CLOCK RECOVERY CIRCUIT AND ADAPTIVE SAMPLE AND EQUALIZER TIMING

FIELD

The subject matter disclosed herein relates generally to the field of communications, and more particularly to high speed electronic signaling within and between integrated circuit devices.

BACKGROUND

Synchronous digital systems employ clock signals to coordinate the transmission and receipt of data. For example, a transmitter might synchronize transmitted data to a clock signal and then convey the synchronized data and clock signals to a receiver. The receiver might then recover the data using the clock signal. High-performance digital transmitters often communicate data unaccompanied by a clock signal with which to synchronize the receiver. Instead, the receiver phase-aligns a locally generated receive clock signal to the incoming data and uses the phase-adjusted "recovered" clock signal to sample the data. Receive circuitry for sampling data using a recovered clock signal is commonly referred to as "clock and data recovery" (CDR) circuitry.

High-performance communication channels suffer from many effects that degrade signals. Primary among them is inter-symbol interference (ISI) from high frequency signal attenuation and reflections due to impedance discontinuities. ISI becomes more pronounced at higher signaling rates, ultimately degrading signal quality such that distinctions between originally transmitted signal levels may be lost. Some receivers therefore mitigate the effects of ISI using one or more equalizers, and thus increase the available signaling rate. Typical types of equalizers include linear equalizers, feed-forward equalizers (FFEs), and decision-feedback equalizer (DFEs).

BRIEF DESCRIPTION OF THE DRAWINGS

The subject matter disclosed is illustrated by way of example, and not by way of limitation, in the figures of the accompanying drawings and in which like reference numerals refer to similar elements and in which:

FIGS. 8C through 8F are hypothetical waveform diagrams used in connection with FIGS. 7 and 8A to illustrate the process of applying appropriate receive coefficients RXα[2, 1] to DFE 734 to correct for ISI.

DETAILED DESCRIPTION

Figure 1:
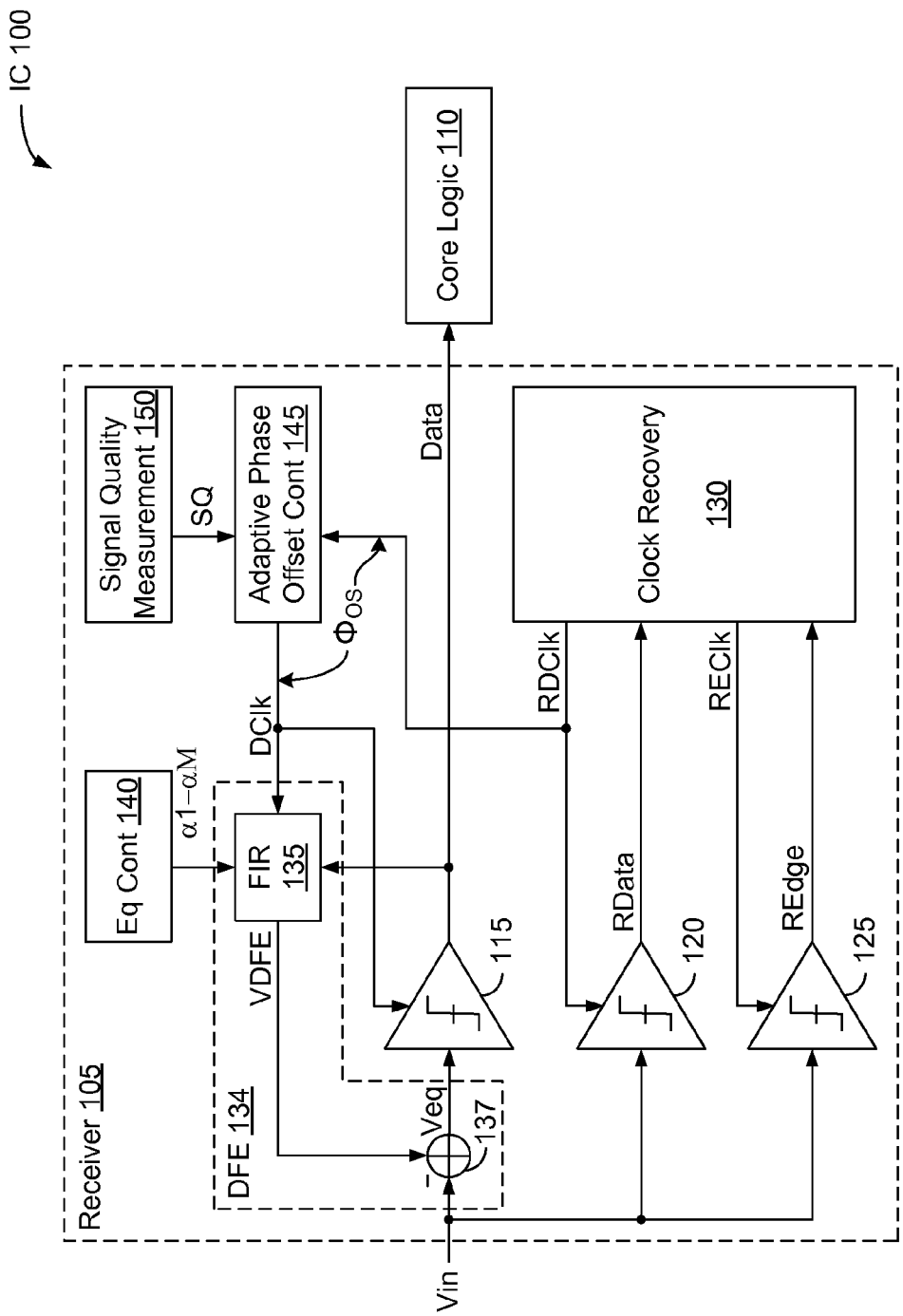
FIG. 1 depicts a portion of an integrated circuit (IC) 100, including a receiver 105 and some core logic 110.

FIG. 1 depicts a portion of an integrated circuit (IC) 100, including a receiver 105 and some core logic 110. Receiver 105 recovers data and timing information from a signal presented on a data input port Vin to produce a series of sampled data Data for core logic 110. Receiver 105 optimizes data and equalization timing for improved signal margins and reduced error rates. Core logic 110 could be any of a myriad of circuit types or combinations of circuit types that communicate with components within or external to IC 100 via receiver 105.

Receiver 105 includes a data sampler 115, a reference-data sampler 120, and a reference edge sampler 125. Clock recovery circuitry 130 recovers reference edge and data clock signals REClk and RDClk from sampled reference edges REdge from sampler 125 and reference data RData from sampler 120. Reference edge clock signal REClk is timed to the average edge (signal transition) timing of signal Vin, where average edge timing may be defined as the average instant at which a signal transition crosses a predetermined threshold (e.g., a reference voltage). Reference data clock RDClk is phase shifted with respect to edge clock REClk such that sampler 120 samples signal Vin at the midpoint between the average edge timing of signal Vin. In a double-data-rate system, for example, data clock signal RDClk may be phase shifted ninety degrees with respect to clock signal REdge. This shift may be fixed or adjustable.

Receiver 105 includes an equalizer 134 coupled between the output and the input of data sampler 115. Equalizer 134 amplifies signal Vin using a range of amplification factors, with higher frequency components typically being treated to higher amplification factors. The resulting equalized signal Veq is conveyed to the input of data sampler 115. The communication channel (not shown) to which receiver 105 is coupled will typically exhibit a low pass filter effect, in which case equalizer 134 may be used to compensate for attenuation of higher-frequency signal components. In general, the goal of equalization is to reduce or minimize the effects of ISI, so equalization is typically accomplished by adjusting one or more characteristics of a signal in a manner that mitigates the effects of ISI.

Equalizer 134, a decision-feedback equalizer (DFE) in the depicted example, includes a finite-impulse-response (FIR) filter 135 and a subtractor 137. FIR 135 multiplies each of M recently received samples Data by a respective one of M tap coefficients α1-αM. Each of the resulting products approximates the ISI at the current symbol time attributable to the respective one of the M prior symbols, and these products are summed to produce a feedback signal VDFE, which represents the cumulative postcursor ISI at the current symbol. Subtractor 137 subtracts signal VDFE from signal Vin before sampler 115 samples the current symbol. Receiver 105 thereby adjusts signal Vin to eliminate or at least mitigate the effects of the postcursor ISI imposed on the current symbol by the prior M symbols.

The optimum values of tap coefficients α1-αM vary between devices and systems, and can change with, for example, temperature, supply voltage, and the signaling environment. Equalization control circuitry 140 is therefore provided to find and maintain appropriate tap coefficients. Some or all of control circuitry 140 can be instantiated separately or as part of the same integrated circuit as the samplers, equalizer, and clock recovery circuitry.

Clock recovery circuitry 130 locks reference data clock RDClk to a position that is not affected by the timing of equalizer 134. This allows signal RDClk to maintain a fixed reference phase relative to the incoming signal Vin, even as the equalizer tap coefficients are adjusted. Because $RData_N$ are sampled from the unequalized signal, these samples will sometimes contain erroneous data. These imperfections can be tolerated for clock recovery, as a small percentage of erroneous data can be filtered by the clock recovery loop.

As discussed below, clock signal RDClk may not be the optimal phase at which to sample $Data_N$ to obtain the lowest bit error rate when accurate interpretation of data symbols is more critical. Receiver 105 is therefore equipped with an adaptive phase-offset controller 145 and signal-quality measurement circuit 150 that together shift the timing of data sampler 115 and DFE 134 to a position that provides improved data recovery (for example, to a position with less residual ISI energy relative to the main cursor).

Signal-quality measurement circuit 150 derives a measure (SQ) of signal quality from some signal-quality criteria, such as the bit-error rate (BER) of receiver 105. Phase-offset controller 145 in turn employs signal SQ to adjust the phase of data clock DClk relative to reference data clock RDClk and edge clock REdge for optimal data recovery. In this example, the phase offset $\Phi_{OS}$ for data clock DClk is measured with respect to reference data clock RDClk. Some or all of controller 145 and measurement circuit 150 can be instantiated separately or as part of the same integrated circuit as the samplers, equalizer, and clock recovery circuitry.

Figure 2:
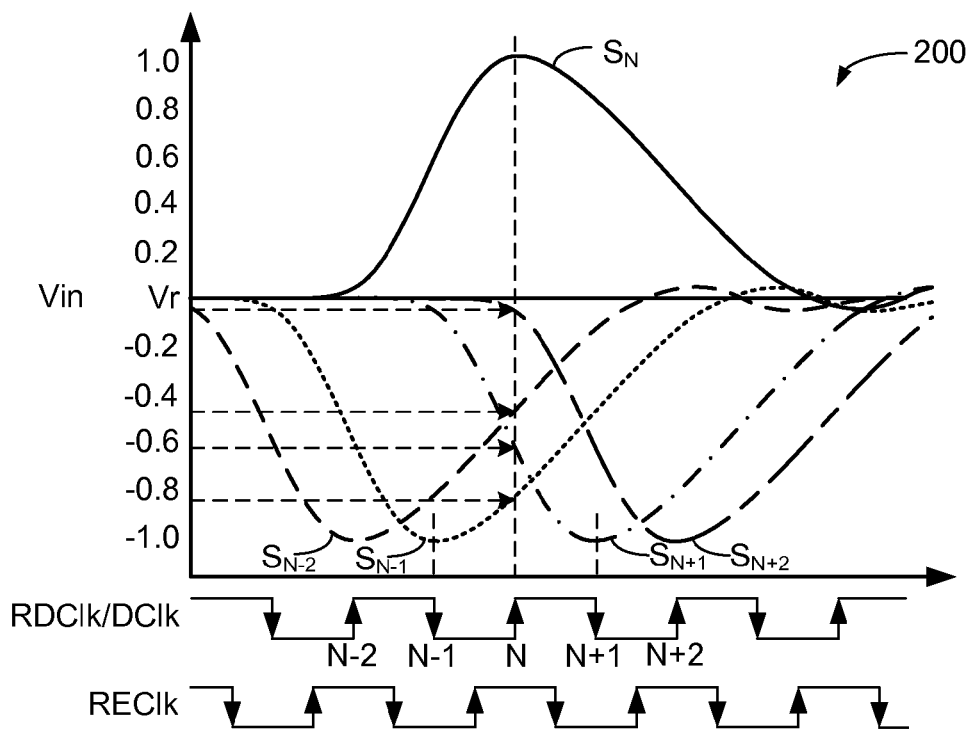
FIG. 2 is a waveform diagram 200 depicting a hypothetical series of overlapping single-bit responses for a series of symbols on node Vin of FIG. 1.

FIG. 2 is a waveform diagram 200 depicting hypothetical overlapping single-bit responses for a series of symbols on node Vin of FIG. 1, and is used to illustrate the deleterious effects of ISI. The depicted clock signals are for a double-data-rate (DDR) receiver in which the data samples occur at both the rising and falling edges of the data clocks RDClk/DClk. The single-bit responses are voltage levels measured with respect to a voltage reference Vr: each single-bit response is normalized to an amplitude of one for ease of illustration, with positive values representing a logic one and negative values representing a logic zero. The x axis represents time, measured in "unit intervals" or "symbol times," with time N representing the current sample instant, or "cursor," and symbol $S_N$ the current symbol.

Each symbol is spread out over time. Energy that occurs in the past with respect to the cursor is termed "precursor ISI," whereas energy that occurs in the future is termed "postcursor ISI." If the symbols are sufficiently wide, a considerable portion of the precursor and postcursor ISI from adjacent symbols can interfere with the interpretation of the current symbol. In the instant hypothetical, at time N:

1. the current symbol $S_N$ has an amplitude of 1.0 volts, a level that is representative of a logic one;
2. symbol $S_{N-2}$ imparts postcursor ISI of about −0.5 volts;
3. symbol $S_{N-1}$ imparts postcursor ISI of about −0.8 volts;
4. symbol $S_{N+1}$ imparts precursor ISI of about −0.6 volts; and
5. symbol $S_{N+2}$ imparts relatively little precursor ISI, and may be ignored in this example; however, the contribution of this and other pre- and post-tap symbols may be considerable.

The sum of the voltages attributable to symbol $S_N$ and the ISI of the four adjacent symbols at time N is therefore about 1.0−0.5−0.8−0.6=−0.9, a level that is representative of a logic zero. Sampling the depicted bit pattern at time N without correcting for ISI would therefore produce an error at time N.

Diagram 200 is simplified for ease of illustration. In practice, the waveform produced by a series of transmitted symbols is a complex combination of the symbols and their overlapping ISI. Because each symbol can affect one or more of its neighbors, the ISI energy imposed on a sampled symbol can vary considerably with the bit pattern. Consider the example of waveform 300 of FIG. 3: the bit pattern expressed is the same as in FIG. 2 except that symbol $S_{N+1}$ is inverted to represent a logic one instead of a logic zero. As a result, the precursor ISI from symbol $S_{N+1}$ is positive, and tends to cancel the negative ISI from the other symbols. The sum of the voltages attributable to symbol $S_N$ and the four adjacent ISI components at time N in this example is about 1.0+0.6−0.5−0.8=0.3, a level that is representative of a logic one. Sampling the depicted bit pattern at time N without correcting for ISI would therefore produce a correct result in this example.

Figure 3:
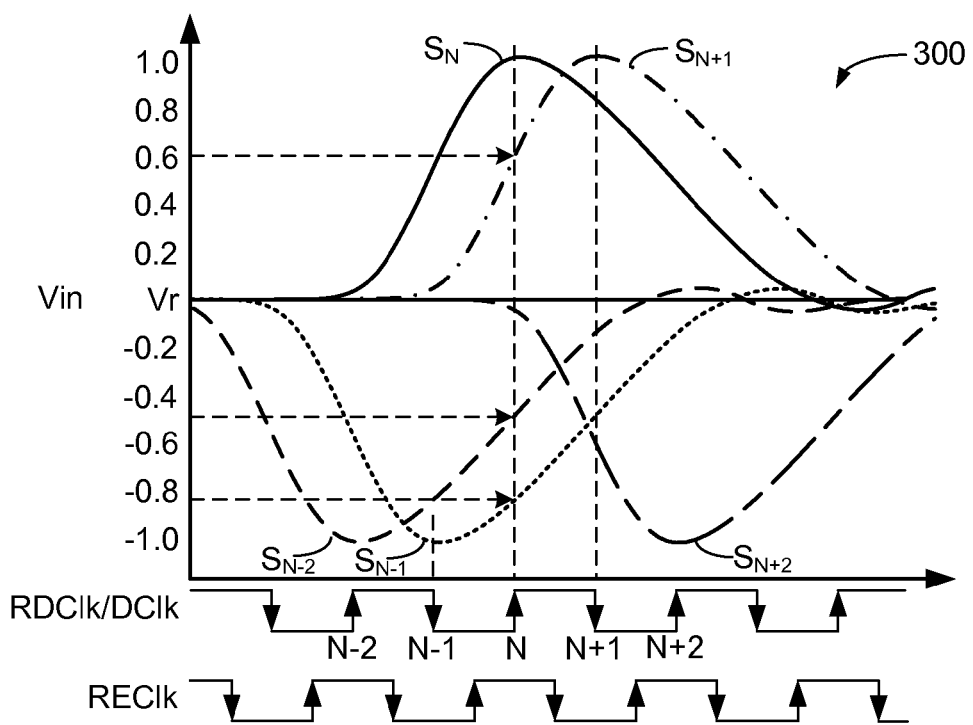
FIG. 3 is a waveform diagram 300 depicting a second hypothetical series of overlapping single-bit responses for a series of symbols on node Vin of FIG. 1.

FIGS. 2 and 3 illustrate the important point that the impact of ISI is data dependent. Returning to FIG. 1, clock recovery circuitry 130 depends on samplers 120 and 125 for clock recovery, and samplers 120 and 125 sample the incoming signal before DFE 134 has reduced the impact of ISI. Clock recovery circuitry 130 may therefore base timing adjustments on erroneous data samples. Clock recovery circuitry 130 can accommodate erroneous data if the bit error rate is sufficiently low. One or both of samplers 120 and 125 may sample equalized signal Veq in other embodiments.

Figure 4:
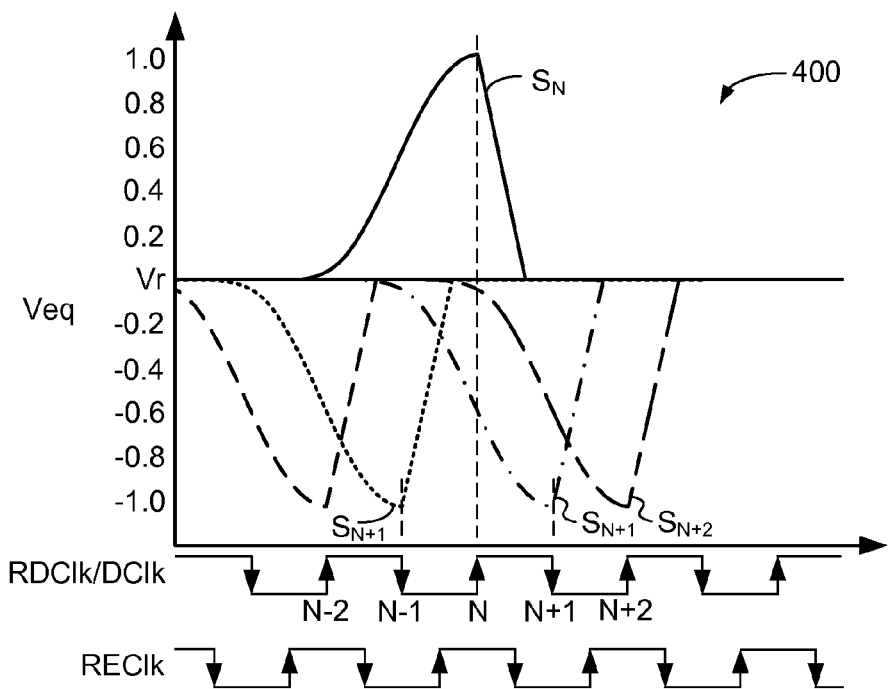
FIG. 4 is a waveform diagram 400 depicting hypothetical single-bit responses for an equalized series of symbols on node Veq of FIG. 1.

FIG. 4 is a waveform diagram 400 depicting hypothetical single-bit responses for an equalized series of symbols on node Veq of FIG. 1. The bit pattern is the same as in FIG. 2, but the symbol shapes lack much of their postcursor ISI due to the operation of DFE 134 and subtractor 137. Phase offset $\Phi_{OS}$ is set to zero, so data clock DClk and reference data clock RDClk are identical. At sample time N, the amplitude of symbol $S_N$ is about 1.0 and the precursor ISI components associated with symbols $S_{N+1}$ and $S_{N+2}$ are about −0.6 and −0.05, respectively. The postcursor ISI associated with symbols $S_{N-1}$ and $S_{N-2}$ are filtered out, however, so that the sum of the current symbol and the ISI at time N is just under 0.4 Volts. This positive voltage level would be correctly interpreted as a logic one, showing that postcursor ISI removal by DFE 134 and subtractor 137 has improved the operation of the receiver.

Figure 5:
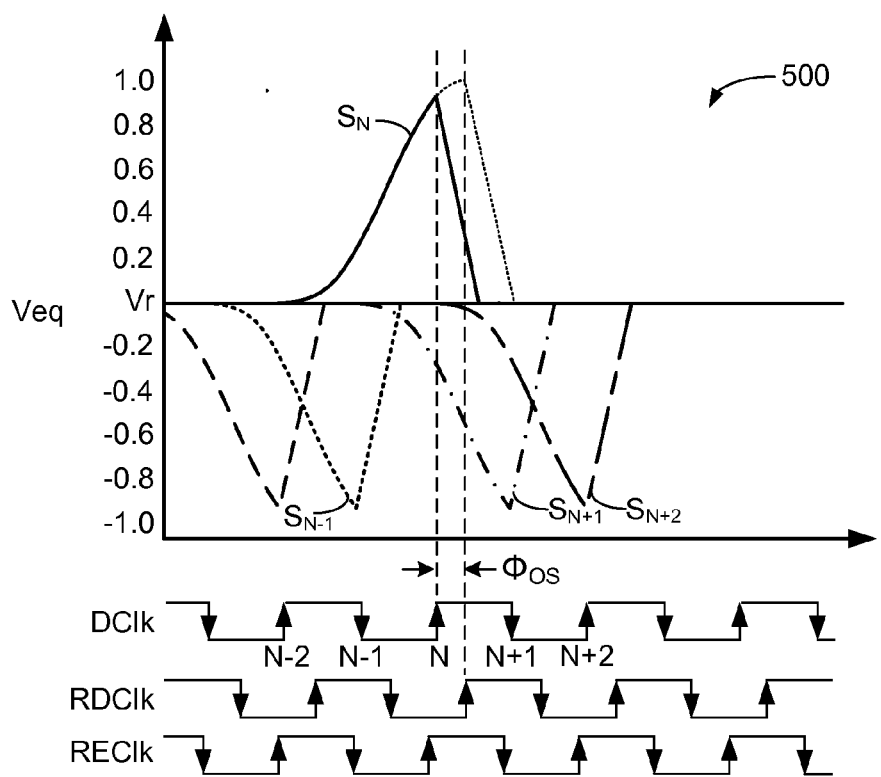
FIG. 5 is a waveform diagram 500 depicting another hypothetical series of single-bit responses for an equalized series of symbols on node Veq of FIG. 1.

FIG. 5 is a waveform diagram 500 depicting another hypothetical series of single-bit responses for an equalized series of symbols on node Veq of FIG. 1. The bit pattern is the same as in FIGS. 2 and 4, and the symbol shapes again lack much of their postcursor ISI due to the operation of DFE 134 and subtractor 137. In addition, phase offset $\Phi_{OS}$ advances data clock DClk by almost half the unit interval with respect to reference data clock RDClk. At sample time N, the amplitude of symbol $S_N$ is about 0.9, less than it was in FIG. 4 when the phase offset was set to zero; however, the nonzero phase offset $\Phi_{OS}$ moves both the DFE timing and the cursor position such that the precursor ISI associated with symbols $S_{N+1}$ and $S_{N+2}$ are considerably lower than in the example of FIG. 4, about −0.3 and zero, respectively. The sum of the current symbol and the ISI of waveform 500 is about 0.6 Volts, a 50% increase over the example of FIG. 4. This positive voltage level would be correctly interpreted as a logic one, and the greater magnitude of the positive voltage reflects a higher margin for error. Receiver 105 can thus alter sample and DFE timing to increase voltage margin and consequently improve noise tolerance and reduce bit error rates.

Figure 6:
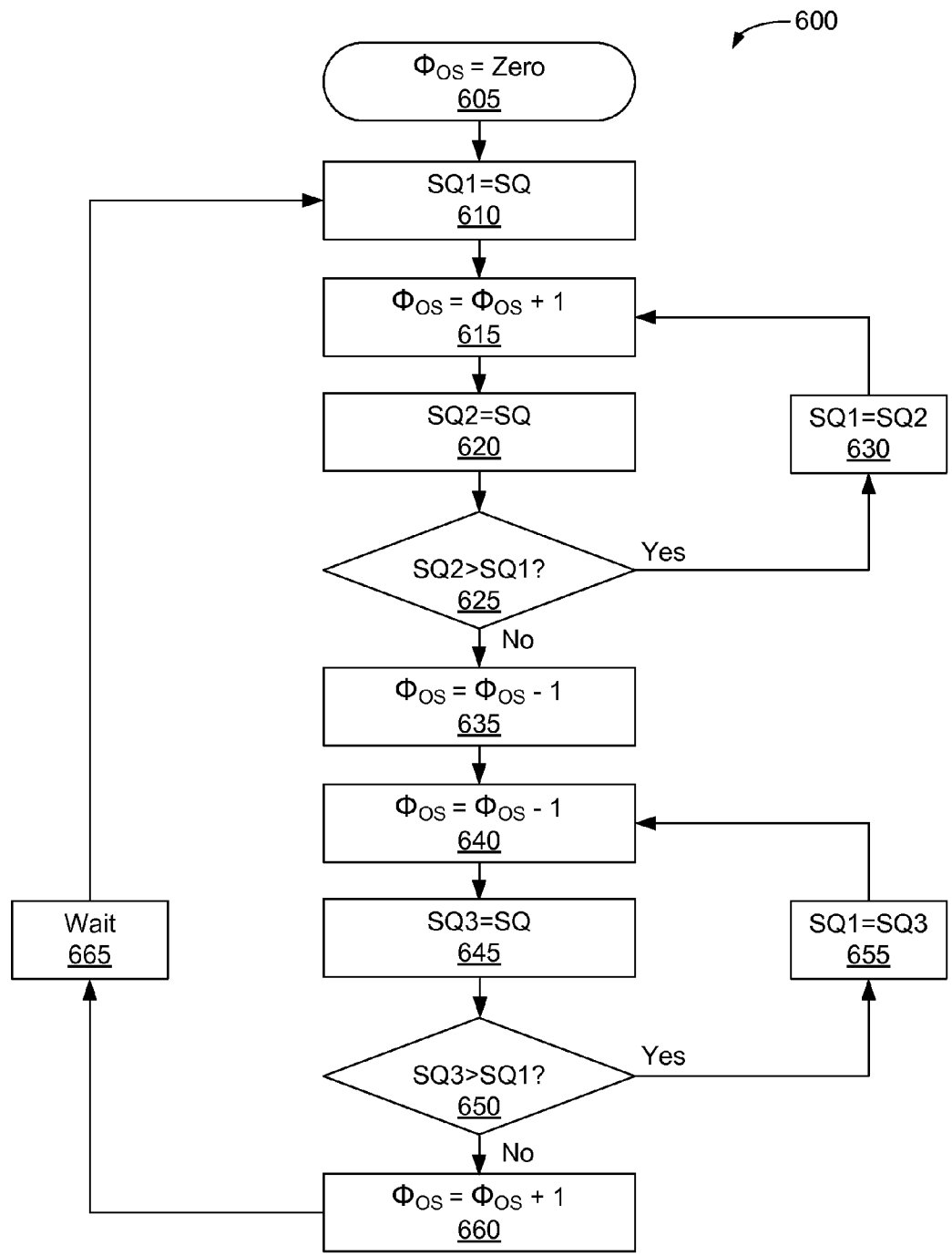
FIG. 6 is a flowchart 600 depicting a phase offset calibration method that can be applied to the embodiment of receiver 105 of FIG. 1.

FIG. 6 is a flowchart 600 depicting a phase-offset calibration method that can be applied to the embodiment of receiver 105 of FIG. 1. To begin, phase offset controller 145 sets phase offset $\Phi_{OS}$ equal to zero, in which case clock signal DClk is phase aligned with clock signal RDClk (step 605). The DFE tap coefficients are allowed to settle to stable values at this phase offset. Signal-quality measurement circuit 150 then conveys a first measure of signal quality SQ1 to controller 145 via port SQ (step 610). The measure of signal quality, now stored in controller 145, may be based upon such measures as, for example, the voltage margin, timing margin, or the bit error rate of receiver 105.

Next, phase-offset controller 145 increments phase offset $\Phi_{OS}$ (step 615), which advances the phase of clock signal DClk with respect to signal RDClk. After allowing the DFE tap coefficients α1-αM to settle to stable values at the new phase offset, measurement circuit 150 conveys a second measure of signal quality SQ2 to controller 145 via port SQ. Phase offset controller 145 then compares signal quality measures SQ1 and SQ2 to determine whether the increased phase offset improved signal quality (decision 625). If so, then measure SQ1 is overwritten with the value of measure SQ2 (step 630) and the process returns to step 615. If not, then the phase offset is decremented twice (steps 635 and 640), the DFE coefficients α1-αM are again allowed to settle to stable values, and signal quality is measured once again to obtain a third measure of signal quality SQ3. Per decision 650, if this third measure is greater than the first, then measure SQ1 is set to the improved measure SQ3 (step 655) and the process returns to step 640 to determine whether further reductions in the phase offset yield further improvements in signal quality. If decision 650 does not indicate an improved measure of signal quality, then the phase offset is incremented (step 660) and the method moves to step 665 to await a subsequent initiation of the phase-offset calibration process. The process of flowchart 600 thus settles upon a phase offset that provides maximal signal quality and then may be repeated occasionally or periodically to accommodate signal drift that might occur due to e.g. supply-voltage fluctuations and changes in temperature and the noise environment.

Figure 7:
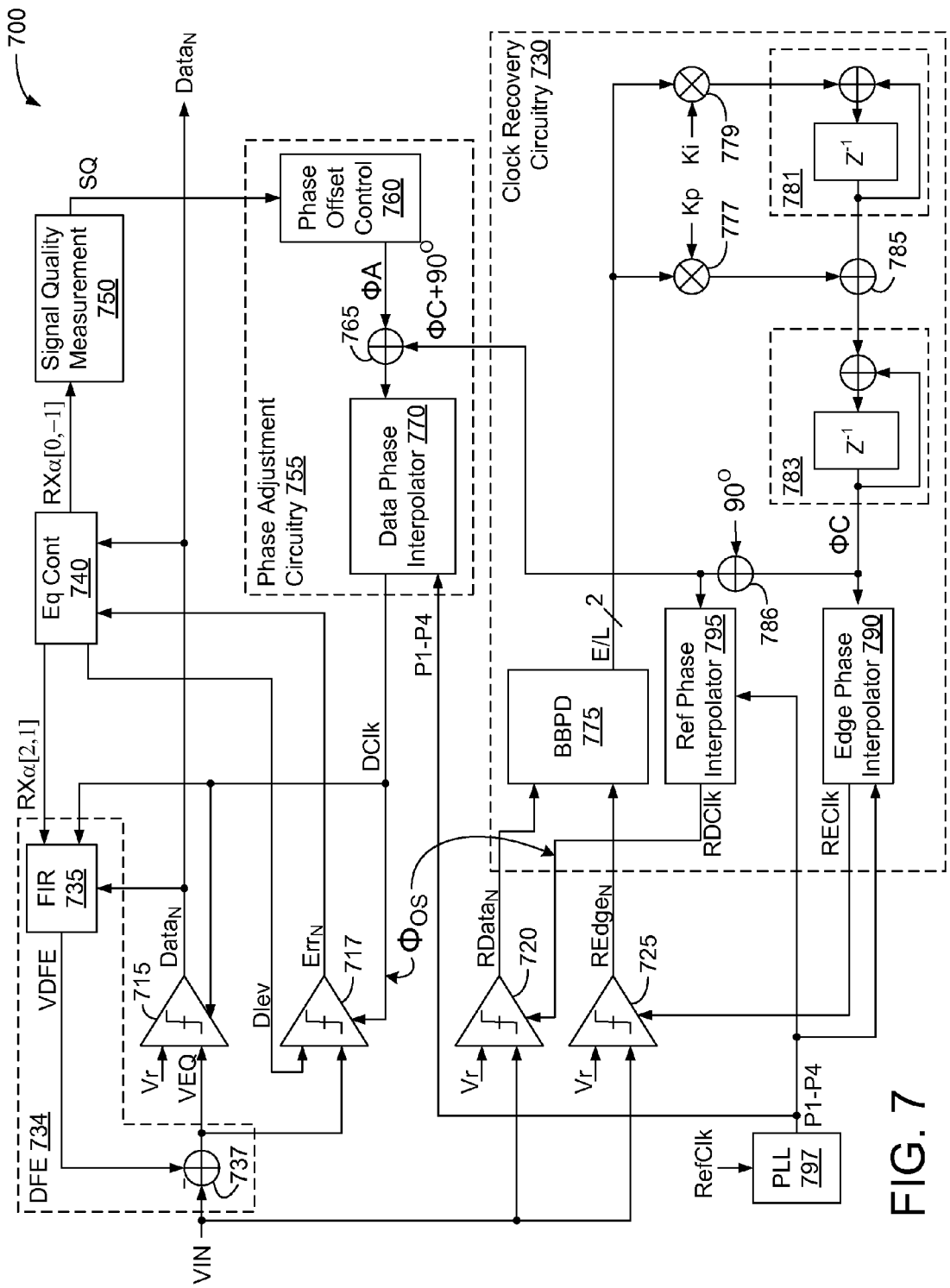
FIG. 7 depicts a receiver 700 in accordance with another embodiment.

FIG. 7 depicts a receiver 700 in accordance with another embodiment. Receiver 700 includes a data sampler 715, an error sampler 717, a reference-data sampler 720, a reference edge sampler 725, and a DFE 734. DFE 734 in turn includes an FIR 735 and a subtractor 737. Clock recovery circuitry 730 recovers reference edge and reference data clock signals REClk and RDClk from sampled reference data $RData_N$ and edges $REdge_N$. Reference data clock RDClk is phase shifted with respect to edge REClk such that sampler 720 samples signal Vin at the midpoint between the sample instants of sampler 725. In a double-data-rate system, for example, clock signal RDClk may be phase shifted ninety degrees with respect to clock signal REClk.

FIR 735 multiplies the two most recently received symbols from sampler 715 by a respective one of tap coefficients RXα[1] and RXα[2]. Each of the resulting products represents the ISI contributed to the current symbol $Data_N$ by the respective prior symbol, and the sum of these products VDFE represents the cumulative ISI from those symbols. Subtractor 737 subtracts the combined ISI components VDFE from signal Vin before sampler 715 samples the current data symbol $Data_N$. The optimal values of tap coefficients RXα[1] and RXα[2] vary between devices and systems, and can change with temperature, supply voltage, and the noise environment. Adaptive equalization control circuitry 740 is therefore provided to find and maintain appropriate tap coefficients.

Clock recovery circuitry 730 can lock reference data signal RDClk to a position that suboptimally accounts for the ISI characteristics of input signal Vin, and that consequently results in erroneous samples. These imperfections can be tolerated for edge recovery, as a small amount of erroneous data can be filtered out by the clock recovery loop. Such suboptimal sample timing is more of an issue with data recovery, however, where accurate interpretation of data symbols is critical. Receiver 700 is therefore equipped with adaptive signal quality measurement circuitry 750 and associated phase-adjustment circuitry 755 that together shift the timing for data sampler 715 and DFE 734 to a position with less residual ISI energy relative to the current symbol $Data_N$.

Signal quality measurement circuitry 750 derives a measure SQ of signal quality from some signal-quality criteria. In this example, the measure of signal quality is the difference between the average voltage level for the current symbol $S_N$ and the average precursor ISI imposed by the next symbol $S_{N+1}$. These values are represented in FIG. 7 as tap values RXα[0] and RXα[−1], respectively, and are calculated by equalization control circuitry 740 in a manner detailed below. In summary, signal quality measurement circuitry 750 subtracts the absolute value of tap value RXα[−1] from the absolute value of tap value RXα[0] to produce signal SQ. The difference thus calculated is a measure of the magnitude of precursor ISI relative to the current symbol, and is consequently a measure of signal quality. A phase-offset controller 760 employs signal SQ to optimize a phase-adjust signal ΦA to an adder 765, the output of which controls the phase of sample clock DClk via a phase interpolator 770. The phase relationship between data clock DClk and the reference clocks derived from samples produced by reference samplers 720 and 725 is therefore optimized for recovery of data $Data_N$.

Clock recovery circuitry 730 includes a bang-bang (Alexander) phase detector 775, multipliers 777 and 779, digital accumulators 781 and 783, adders 785 and 786, an edge phase interpolator 790, a reference-data phase interpolator 795. Phase detector 775 logically combines the current reference data sample $RData_N$, the prior reference data sample $RData_{N-1}$ (not shown), and the current reference edge sample $REdge_N$ between the current and prior data samples to determine whether the edge between the current and prior data samples is early or late with respect to the reference clock edge. Alexander phase detectors are well known to those of skill in the art, so a detailed discussion is omitted. Briefly, samples $RData_N$ and $RData_{N-1}$ are one bit period (one unit interval) apart and sample REdge$_N$ is sampled at half the bit period between samples RData$_N$ and RData$_{N-1}$. If the current and prior samples RData$_N$ and RData$_{N-1}$ are the same (e.g., both represent logic one), then no transition has occurred and there is no "edge" to detect. In that case, the outputs E and L of phase detector 135 are both zero. If the current and prior samples RData$_N$ and RData$_{N-1}$ are different, however, then the edge sample REdge$_N$ is compared with the current and prior samples RData$_N$ and RData$_{N-1}$: if sample REdge$_N$ equals prior sample RData$_{N-1}$, then late signal L is asserted; and if sample REdge$_N$ equals current sample RData$_N$, then the early signal E is asserted. In this disclosure, a "late" edge arrives late with respect to the sampling clock, whereas an "early" edge arrives early with respect to the sampling clock.

Multiplier 779 multiplies the phase error signal E/L by a constant Ki and outputs the multiplied value to accumulator 781. Multiplier 777 multiplies phase error signal E/L by a constant Kp and outputs the multiplied value to adder 785, which sums the outputs of multiplier 777 and accumulator 781 and passes the result to phase accumulator 783. Phase accumulator 783 accumulates a phase control signal ΦC that is passed to interpolator 790 and adder 786. Phase interpolators 790 and 795 derive edge and data clocks REClk and RDClk, respectively, by combining selected ones of a plurality of differently phased clock signals P1-P4 that a phase-locked loop PLL 797 derives from a local reference clock RefClk. Adder 786 can add a fixed or variable offset to phase control signal ΦC. In this DDR embodiment, adder 786 adds a fixed 90-degree offset to phase control signal ΦC (i.e., ΦC+90°). In this way, clock recovery circuitry 730 maintains the sample timing of reference data clock RDClk centered between edges of the incoming data.

The four differently phased clock signals P1-P4 from PLL 797 are conveyed to data phase interpolator 770 of phase adjustment circuitry 755 along with the sum of phase-adjust signal ΦA and phase-control signal ΦC. Phase interpolator 770 combines selected ones of signals P1-P4 such that clock signal DClk is phase shifted with respect to clock signal RDClk by an amount determined by phase adjust signal ΦA, and thereby shifts data-sample and equalization timing to a position that provides improved signal quality.

Figure 8A:
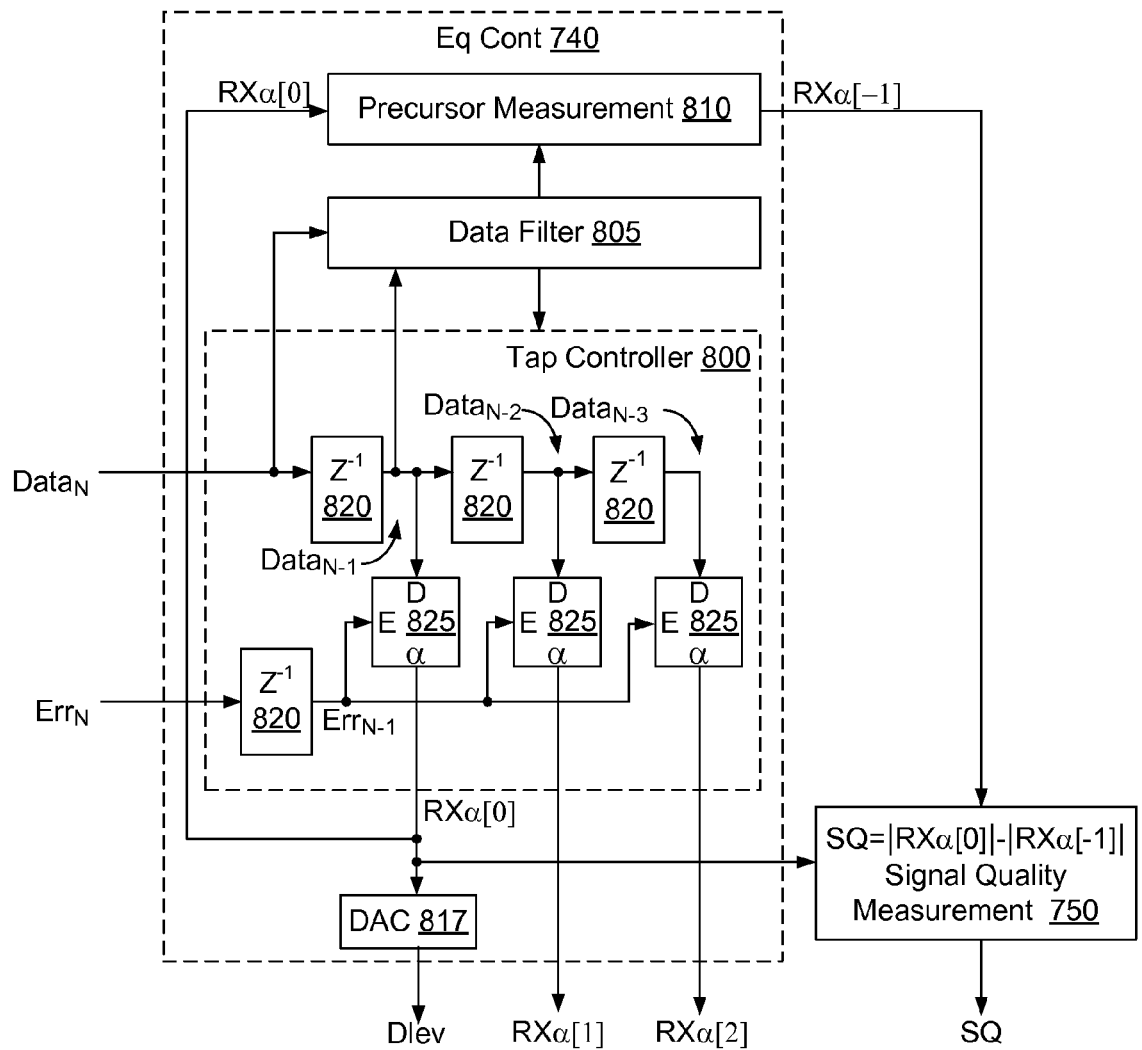
FIG. 8A details equalization control circuitry 740 and signal quality measurement circuitry 750 in accordance with one embodiment.

FIG. 8A details equalization control circuitry 740 and signal quality measurement circuitry 750 in accordance with one embodiment. Equalization control circuitry 740 includes a tap controller 800, a data filter 805, a precursor measurement block 810, and a DAC 817. Tap controller 800 includes a number of synchronous storage elements 820 and tap-value generators 825 that together generate tap coefficients RXα[2, 1,0] from data and error samples Data$_N$ and Err$_N$. Tap value RXα[0] is a digital measure of the average amplitude of the received data symbols S$_N$, which DAC 817 converts into voltage Dlev, the reference voltage for error sampler 717 of FIG. 7. Tap values RXα[2,1] are the receive coefficients for DFE 734, also of FIG. 7.

The error comparisons that produce error signals Err$_N$ are based upon the upper signal level defined by voltage Dlev. Tap controller 800 thus only updates the tap values RXα[2,1,0] based upon Err$_{N-1}$ measurements that take place when the data sample Data$_{N-1}$ is a logic one. Data filter 805 therefore prevents tap controller 800 from updating tap values RXα[2, 1,0] when sample Data$_{N-1}$ is a logic zero. Other embodiments can include a second comparator/sampler pair to generate error samples when Data$_{N-1}$ is a logic zero, such as by comparing the incoming signal Veq with the lower data level −Dlev, or the reference voltage to the error sampler can be varied over a number of values or ranges of values to facilitate additional testing and error-correction methods. Receive coefficients RXα[2,1,0] are adjusted such that DFE 734 effectively cancels postcursor ISI associated with the preceding two data symbols in the manner discussed above in connection with FIGS. 1-4.

Returning to FIG. 8A, the value RXα[0] is a measure of the average amplitude for symbols S$_N$ and the value RXα[−1] is a measure of the first precursor ISI magnitude from symbols S$_{N+1}$. The difference between the absolute values of these measures is therefore representative of signal quality, and is used in the embodiment of FIG. 7 to control the phase offset for clock signal DClk. Stated mathematically, SQ=|RXα[0]|−|RXα[−1]|. Signal quality measurement circuitry 750 receives signals RXα[0] and RXα[−1] and performs the foregoing calculation to obtain measures of signal quality SQ for phase offset controller 760.

Figure 8B:
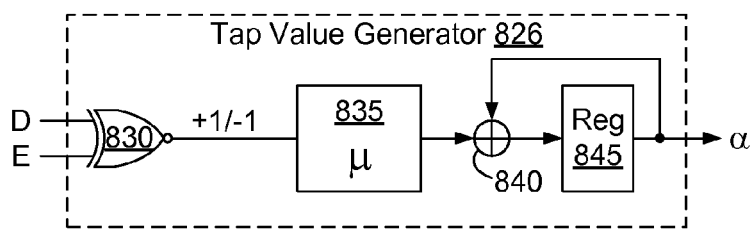
FIG. 8B details an embodiment of a tap-value generator 826, that may be used as tap-value generator 825 of FIG. 8A and, that is capable of generating a tap value using a sign-sign, least-mean-squared (LMS) algorithm.
Figure 11:
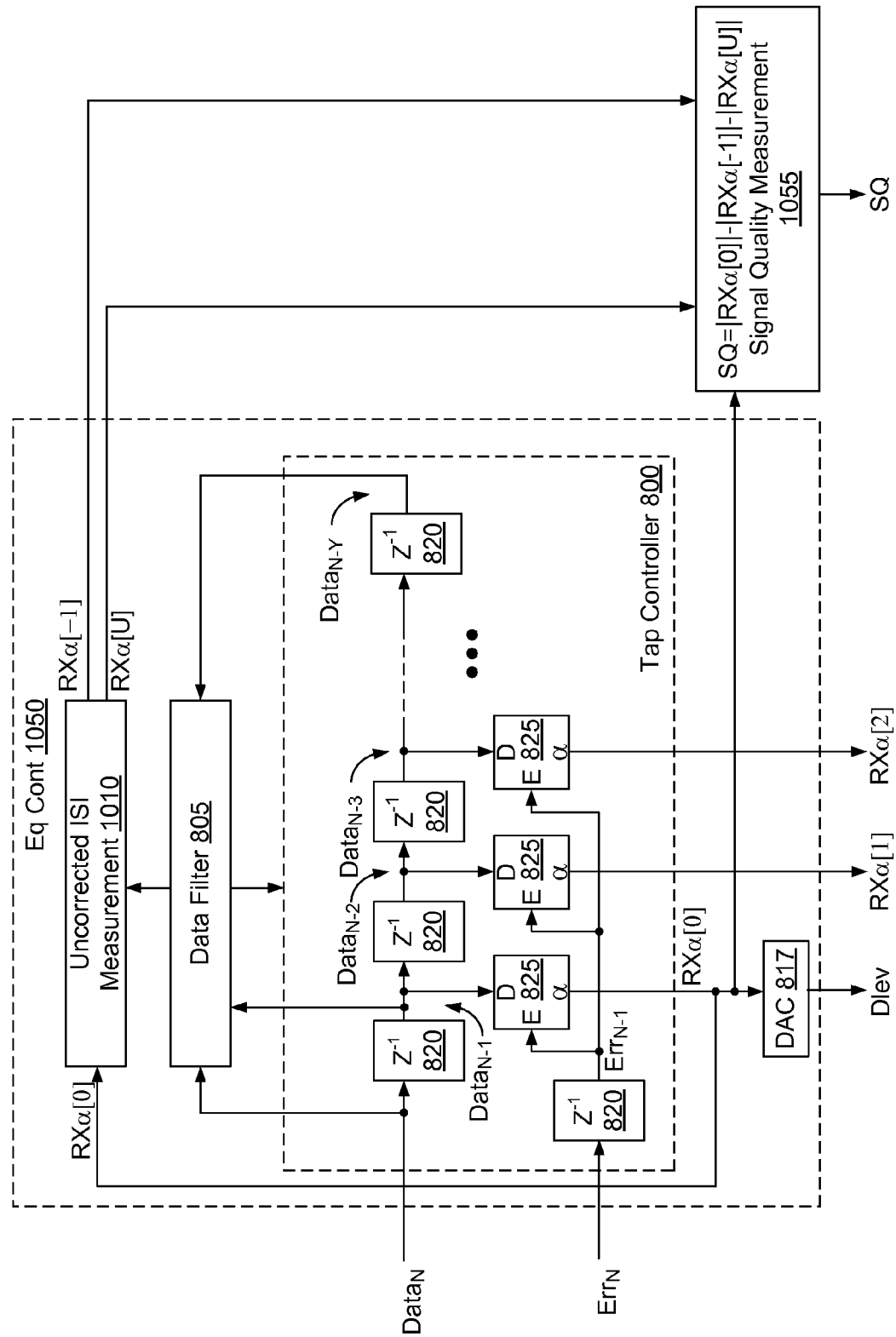
FIG. 11 depicts equalization control circuitry 1050 and signal quality measurement circuitry 1055 of FIG. 10 in accordance with one embodiment.

FIG. 8B details an embodiment of a tap-value generator 826 that generates a tap value using a sign-sign, least-mean-squared (LMS) algorithm, and which may be used in place of tap-generator 825 of FIG. 8A or 11. Other algorithms, such as linear- or gradient-descent LMS, can be used in other embodiments. Generator 825 includes an XNOR gate 830, a multiplier 835 that multiplies the output of XNOR gate 830 by a constant μ, an adder 840, and a register 845. XNOR gate 830 compares the corresponding data and error samples and presents its output to multiplier 835. The output of XNOR gate 830 represents a logic one for true and a logic negative one for false. The data and error samples represent the signs of the sampled values, so XNOR gate 830 has the effect of multiplying the signs and presenting the resulting product to multiplier 835. Multiplier 835 multiplies the product from XNOR gate 830 by a selected step size μ, which may be tailored for the selected filter tap. Adder 840 adds the output from multiplier 835 to the current contents of register 845, which is then updated with the new count. Register 845 thus accumulates a count representative of the alpha value for the filter tap associated with data samples of a particular latency (e.g., data samples D$_{N-2}$).

FIGS. 8C through 8F are hypothetical waveform diagrams used in connection with FIGS. 7 and 8A to illustrate the process of applying appropriate receive coefficients RXα[2, 1] to DFE 734 to correct for ISI. FIG. 8C depicts an idealized transmit pulse 850 for which the value expressing the current data sample D$_N$ at node VIN is normalized to a value of one (1.0) and the prior and subsequent data samples D$_{N-1}$ and Data$_{N+1}$ are each normalized to a value of zero (0.0). FIG. 8D depicts, as a pulse 852, a version of transmit pulse 850 filtered by the receive channel and appearing at node VIN. As compared with pulse 850, pulse 852 is attenuated to a maximum amplitude of about 0.5 for the current data sample D$_N$, the corrupted version of which is labeled cD$_N$. The pulse is further corrupted by channel ISI, which leads to erroneous positive signal amplitudes of approximately cD$_{N+1}$=0.12 and cD$_{N+2}$=0.02 at the two succeeding symbol times, and cD$_{N-1}$=0.05 at the preceding symbol time. The objective of receive equalization is, in part, to compensate for the ISI effects at the symbol times succeeding the main symbol time.

FIG. 8E is a waveform diagram 854 in which a receive-coefficient waveform 855 is shown with the shape of pulse 852 of FIG. 8D to illustrate how the receive coefficients are applied to compensate for ISI imposed by the receiver channel. In the example, the channel imposed ISI components cD$_{N+1}$ and cD$_{N+2}$ of respective amplitudes 0.12 and 0.02 at the two symbol times succeeding reception of corrupted data symbol cD$_N$. DFE 734 therefore subtracts coefficient waveform 855 from the received pulse 852 to cancel the ISI: DFE 734 subtracts Data$_N$*RXα[1] from the received signal one symbol time after cD$_N$ and subtracts Data$_N$*RXα[2] from the received signal two symbol times after $cD_N$. In this example, $RX\alpha[0]$ is about 0.50, $RX\alpha[1]$ about 0.12, and $RX\alpha[2]$ about 0.02.

FIG. 8F depicts an equalized waveform 856 that is the sum of waveforms 852 and 855 of FIG. 8E. Ideally, the compensation provided by DFE 734 exactly counteracts the ISI associated with the prior data symbols without adversely impacting the current symbol. In practice, however, the application of receive coefficients may impact the current symbol $eD_N$. Furthermore, ISI associated with the first precursor tap is not cancelled in this example, and therefore leaves a noise artifact $cD_{N-1}$ in waveform 856 one symbol time prior to receipt of the current symbol. The two post-tap artifacts are cancelled in this example, however, leaving equalized signal values $eD_{N+1}$ and $eD_{N+2}$ of amplitude zero.

Returning to FIG. 8A, signal quality measurement circuitry 750 employs receive coefficients $RX\alpha[0,-1]$ to calculate signal quality measure SQ. Receive coefficient $RX\alpha[-1]$ is calculated as discussed above in connection with FIG. 8B, and precursor measurement block 810 and data filter 805 together use coefficient $RX\alpha[0]$ to calculate $RX\alpha[-1]$. The following discussion shows how equalization controller 740 of FIGS. 7 and 8A can calculate a precursor receive-channel coefficient $RX\alpha[-1]$ in accordance with one embodiment.

Figure 8G:
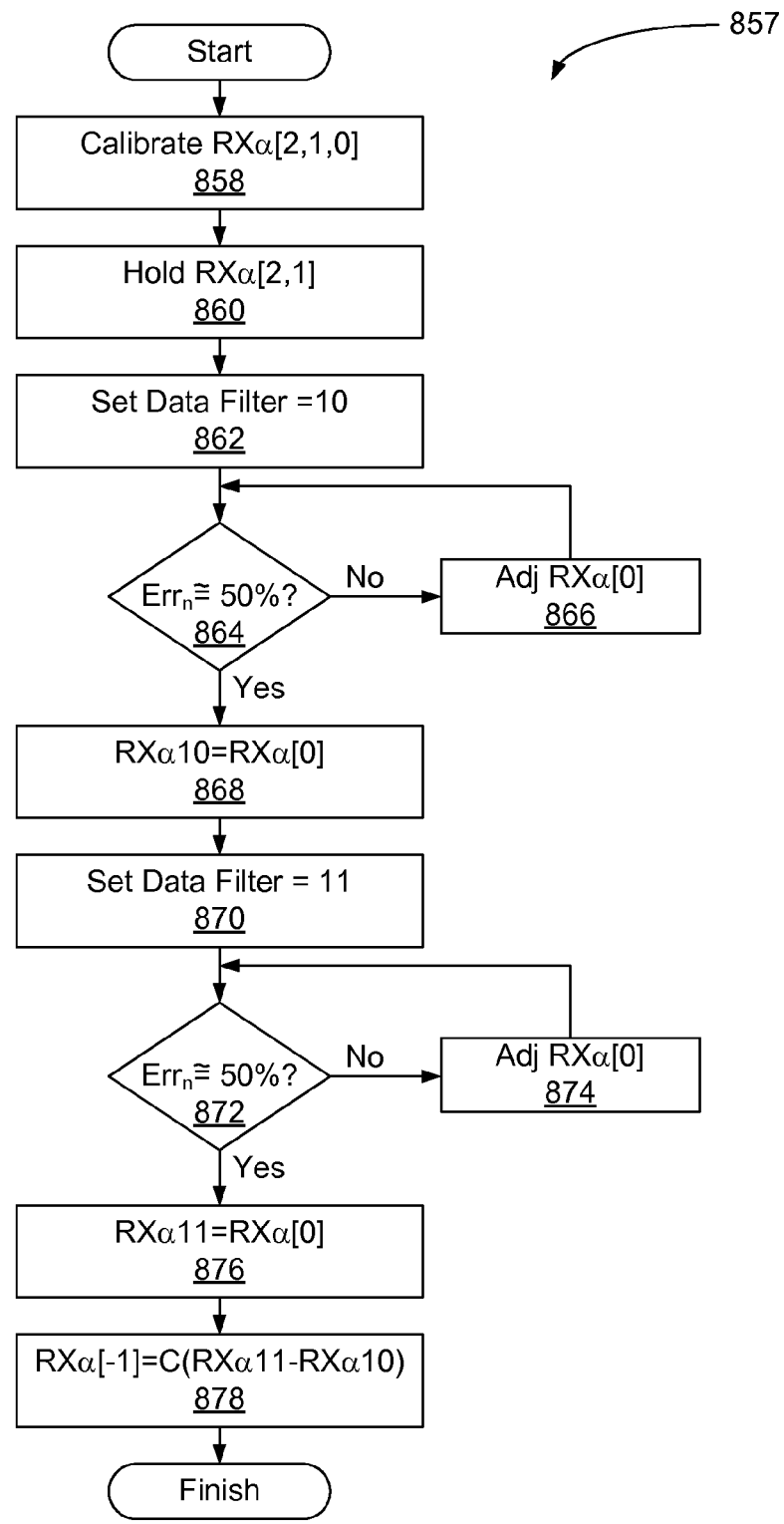
FIG. 8G is a flowchart 857 outlining a process by which precursor measurement block 810 of FIG. 8A may calculate precursor receive-channel coefficient RXα[−1].

FIG. 8G is a flowchart 857 outlining a process by which precursor measurement block 810 of FIG. 8A may calculate precursor receive-channel coefficient $RX\alpha[-1]$. First, in step 858, the receive coefficients $RX\alpha[2,1,0]$ are calculated in the manner detailed above. In some embodiments, step 858 is accomplished by first holding values $RX\alpha[2,1]$ constant until value $RX\alpha[0]$ reaches equilibrium, at which time voltage Dlev represents a measure of the average symbol amplitude for signal Veq. With reference to FIG. 7, voltage Dlev is considered to represent the amplitude of signal Veq when error signal $Err_{N-1}$ is equally likely to express a logic one or a logic zero when the corresponding sampled data symbol $Data_{N-1}$ represents a logic one. Once voltage Dlev is established, the other two tap-value generators are enabled to find the remaining receive coefficients $RX\alpha[2,1]$. Once calibrated, the values of receive coefficients $RX\alpha[2,1]$ are held constant (step 860).

Next, in step 862, data filter 805 is set to enable Dlev adjustment when incoming data expresses the pattern "10" (i.e., symbol $Data_{N-1}=1$ and succeeding symbol $Data_N=0$). Per decision 864 and step 866, error samples $Err_{N-1}$ are collected and coefficient $RX\alpha[0]$ adjusted until $Err_{N-1}$ is again 50% 1's and 50% 0's when this pattern is detected. Using the circuitry of FIG. 8A, these adjustments occur automatically as controller 740 finds the coefficient $RX\alpha[0]$, and consequently the level Dlev, specific to "10" data patterns. In step 868, measurement block 810 stores the value of coefficient $RX\alpha[0]$ as $RX\alpha10$. The process of steps 862 through 868 is repeated for data pattern "11". That is, in step 870 data filter 805 is set to enable Dlev adjustment when incoming data expresses the pattern "11" (i.e., symbol $Data_{N-1}=1$ and succeeding symbol $Data_N=1$). Per decision 872 and step 874, error samples $Err_{N-1}$ are collected and coefficient $RX\alpha[0]$, and consequently level Dlev, is adjusted until $Err_{N-1}$ is again 50% 1's and 50% 0's. Measurement block 810 then, in step 876, stores the new value of $RX\alpha[0]$ as $RX\alpha11$.

With coefficients $RX\alpha[2,1]$ calibrated, the difference between values $RX\alpha11$ and $RX\alpha10$ is approximately twice the ISI associated with the first precursor filter position. Filter coefficient $RX\alpha[-1]$ can therefore be calculated using this difference (step 878). In some embodiments the difference may be scaled, as by multiplying the difference by a constant C, or may be otherwise adjusted, for example, to compensate for different transmit characteristics between the transmitting device and the receiver. Other embodiments employ similar techniques to calculate additional pre- or post-cursor transmit or receiver filter coefficients. Returning to the hypothetical example of FIGS. 8C through 8F, it may be seen that corrupted data sample $cD_{N-1}$ has a value of about 0.05, so coefficient $RX\alpha[-1]$ is set to 0.05.

Figure 9:
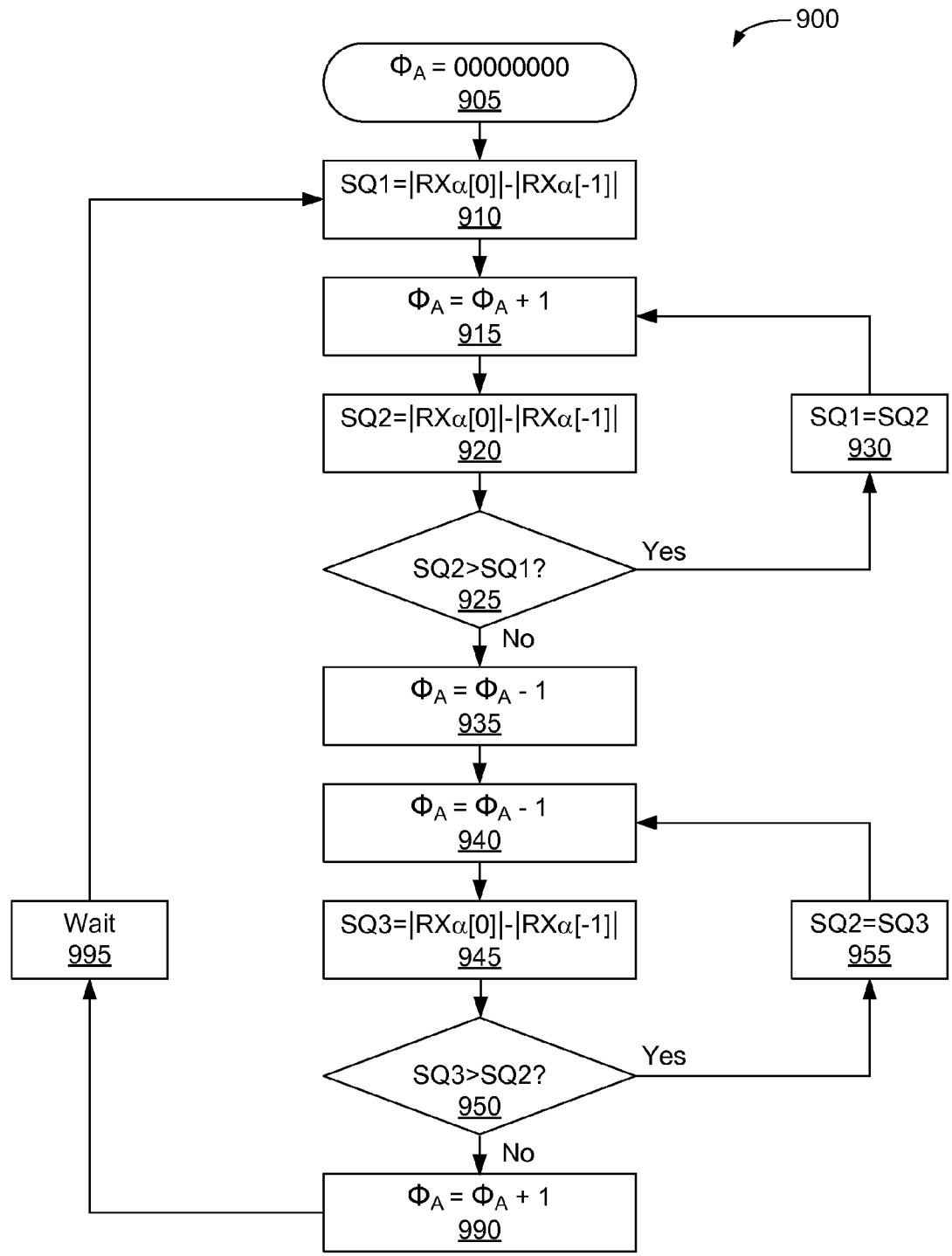
FIG. 9 is a flowchart 900 depicting a phase offset calibration method that can be applied to the embodiment of receiver 700 of FIG. 7.

FIG. 9 is a flowchart 900 depicting a phase offset calibration method that can be applied to the embodiment of receiver 700 of FIG. 7. To begin, phase offset controller 760 sets an eight-bit phase adjustment signal ΦA to e.g. zero, in which case clock signal DClk is phase aligned with clock signal RDClk (step 905). The DFE tap coefficients are allowed to settle to stable values at this phase. Signal quality measurement circuit 750 then conveys a first measure of signal quality SQ to controller 760 via port SQ (step 910). The measure of signal quality, now stored in controller 760, is derived from tap values $RX\alpha[0,-1]$ as noted above, but other factors may be considered instead of or in addition to these values. For example, other embodiments might derive additional tap values for consideration. In the present example, phase offset controller 760 can set phase adjustment signal ΦA to any of 256 values to stepwise advance the phase of clock signal DClk from zero to one unit interval ahead of reference data clock signal RDClk. Other embodiments can offer more or fewer gradations and longer or shorter ranges of phase offsets.

Next, phase offset controller 760 increments phase adjustment signal ΦA (step 915), which advances the phase of clock signal DClk with respect to signal RDClk. The DFE tap coefficients are allowed to settle to stable values at this phase. Phase offset controller 760 then captures a second measure of signal quality SQ2 via port SQ and compares signal quality measures SQ1 and SQ2 to determine whether the increased phase offset improved signal quality (decision 925). If so, then measure SQ1 is overwritten with the value of measure SQ2 (step 930) and the process returns to step 915. If not, then the phase adjustment is decremented twice (steps 935 and 940), the DFE tap coefficients are allowed to settle, and signal quality is measured once again to obtain a third measure of signal quality SQ3. Per decision 950, if this third measure is greater than the first, then measure SQ1 is set to the improved measure SQ3 (step 955) and the process returns to step 940 to determine whether further reductions in the phase offset yield further improvements in signal quality. If decision 950 does not indicate an improved measure of signal quality, then the phase adjustment is incremented (step 960) and the method moves to step 965 to await a subsequent initiation of the phase-offset calibration process. In other embodiments signal quality is measured across the range of phase offset settings in search of a maximum. The phase offset associated with the maximum may then be used as the starting point for step 905.

Figure 10:
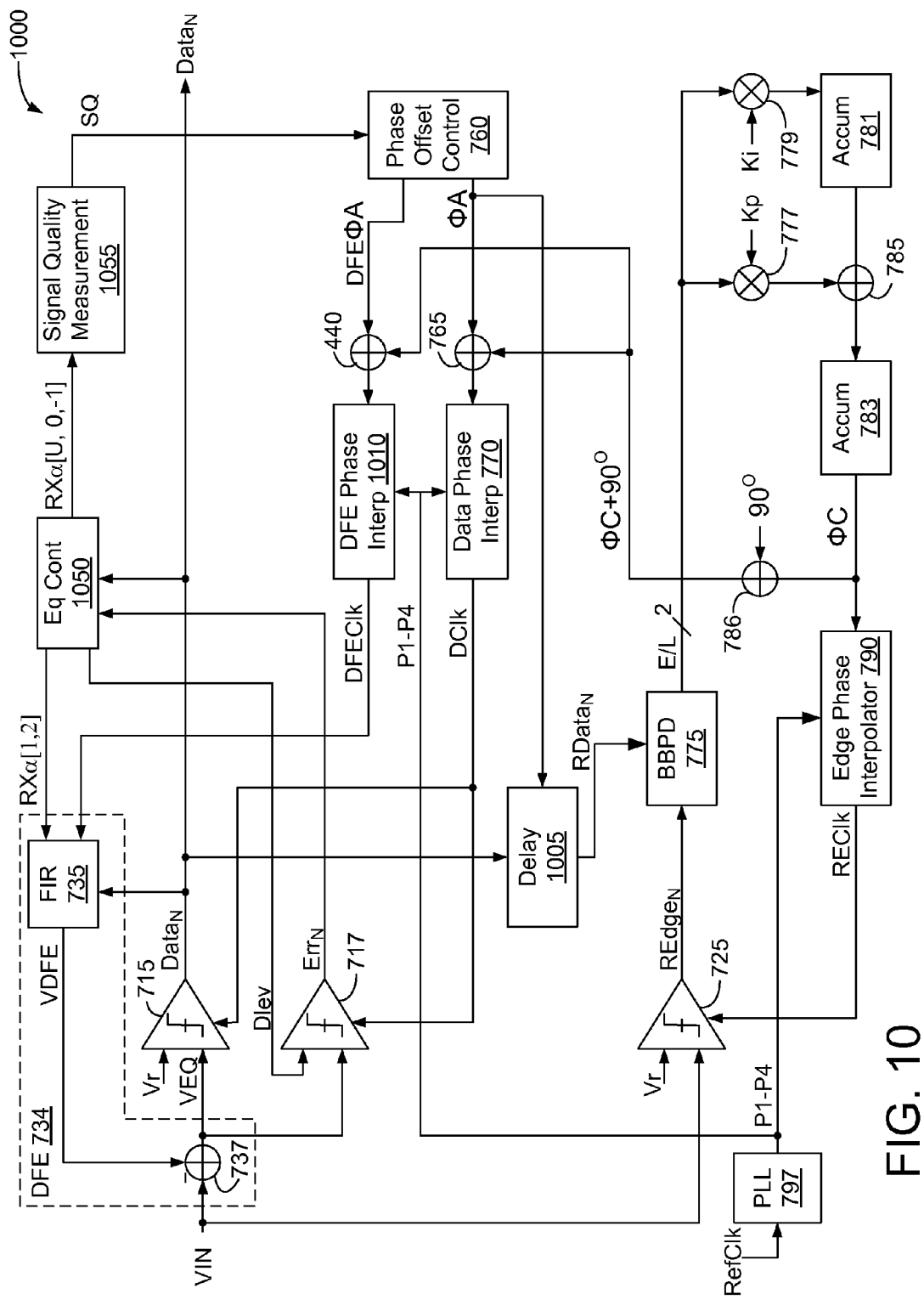
FIG. 10 depicts a receiver 1000 in accordance with yet another embodiment.

FIG. 10 depicts a receiver 1000 in accordance with yet another embodiment. Receiver 1000 is in many ways like receiver 700 of FIG. 7, with like-numbered elements being the same or similar. Receiver 1000 omits a reference data sampler and associated phase interpolator in favor of a delay element 1005 controlled by phase adjustment signal ΦA. Delay element 1005 produces reference data signal $RData_N$ by delaying data signal $Data_N$ by the same amount clock signal DClk is advanced. Reference data signal $RData_N$ therefore remains centered between average symbol edges as data clock DClk is phase shifted to a preferred sample instant. Receiver 1000 may also include a separate phase interpolator 1010 for DFE 734. Phase offset controller 706 is modified to produce a separate phase-adjustment signal DFEΦA to allow clocks signals DClk and DFEClk to be adjusted independently. This circuitry may be included to facilitate test procedures, accommodate disparate delays between DFE 734 and data sampler 715, etc. Delay element 1005 may be replaced with a re-timer to transfer incoming data Data$_N$ from the DClk domain to the REClk domain. Such an embodiment would facilitate both advancing and retarding equalization timing relative to the average edge timing of signal Vin.

Receiver 1000 differs from receiver 700 in another important respect. Equalization control circuitry 740 and signal quality measurement circuitry 750 of FIG. 700 measure signal quality as a function of precursor ISI. Equalization control circuitry 1050 of receiver 1000 additionally measures a postcursor ISI component RXα[U], which signal quality measurement circuitry 1055 employs with components RXα[0,−1] to develop a measure of signal quality SQ. The postcursor ISI component RXα[U] is not fed to DFE 734 in this example, and thus corresponds to an unequalized postcursor signal component.

FIG. 11 depicts equalization control circuitry 1050 and signal quality measurement circuitry 1055 of FIG. 10 in accordance with one embodiment. Equalization control circuitry 1050 is similar to equalization control circuitry 740 of FIGS. 7, 8A, and 8B, like-labeled elements being the same or similar. Equalization control circuitry 1050 includes tap controller 800. Tap controller 800 includes one or more additional storage elements 820 to provide data filter 805 with values of previously received data. Uncorrected postcursor ISI component RXα[U] may be measured in a manner similar to the way in which RXα[−1] was measured according to the method described in FIG. 8G. When measuring RXα[U], uncorrected ISI measurement circuit 1010 uses data patterns selected by data filter 805. For example, data filter 805 may enable Dlev adjustment when the incoming data pattern is such that Data$_{N-1}$=1 and Data$_{N-Y}$=0 in a step corresponding to 802 in FIG. 8G. The resulting value of RXα[0] stored as RXα0U1 in the step corresponding to 868. Value RXα0Y1 is representative of the average signal level when Data$_{N-1}$ is a logical 1 and Data$_{N-Y}$ is a logical 0. Similarly, the data filter may search for occurrences where Data$_{N-1}$=1 and Data$_{N-Y}$=1 in the step corresponding to 876 in FIG. 8G, and the resulting value of RXα[ ] stored as RXα1U1 in the step corresponding to 876. Value RXα1Y1 is representative of the average signal level when Data$_{N-1}$ is a logical 1 and Data$_{N-Y}$ is a logical 1. In a step corresponding to 878 in FIG. 8G, RXα[U] is calculated from RXα1U1 and RXα0U1. In some embodiments of FIG. 11 U=Y−1. The absolute values of RXα[−1] and RXα[U] are both subtracted from the absolute values of RXα[0] to obtain a measure of signal quality SQ. Stated mathematically, SQ=|RXα[0]|−|RXα[1]|−|RXα[U]|. Signal quality measurement circuitry 1055 thus provides measures of signal quality based in part on postcursor ISI to phase offset controller 760.

Figure 12:
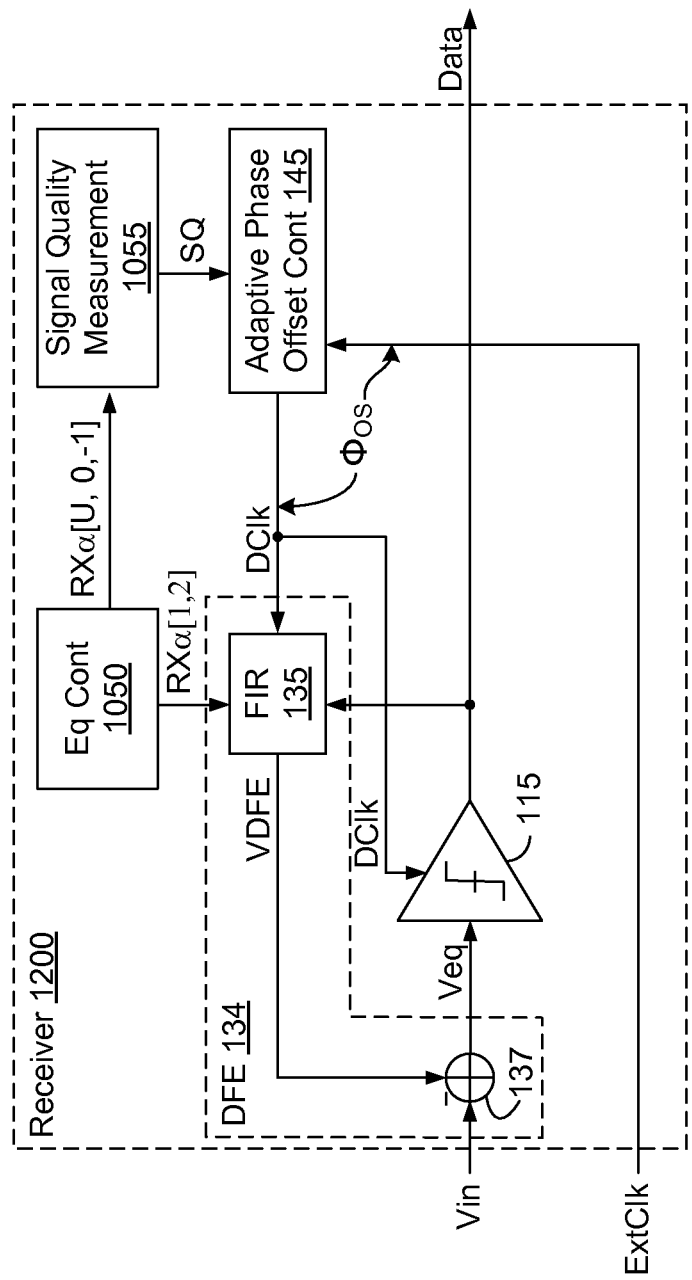
FIG. 12 depicts a receiver 1200 in accordance with another embodiment.

FIG. 12 depicts a receiver 1200 in accordance with another embodiment. Receiver 1200 is similar to receiver 105 of FIG. 1 but is provided with an external reference clock and thus omits clock recovery circuitry and related samplers. Receiver 1200 is equipped with equalization control circuitry 1050 and signal quality measurement circuitry 1055 of FIG. 10, which together allow receiver 1200 to adapt the timing of sampler 115 and DFE 134 relative to clock signal ExtClk based upon a measure of signal quality that takes into account a measure of postcursor ISI. Input signal Vin is timed to clock signal ExtClk, so signal ExtClk is an accurate measure of the average edge timing of signal Vin. Shifting the phase of clock signal DClk relative to external clock signal ExtClk therefore moves the data sample timing relative to the average transition time for signal Vin. In other embodiments ExtClk has a fixed phase offset from the average edge timing of signal Vin.

Figure 13:
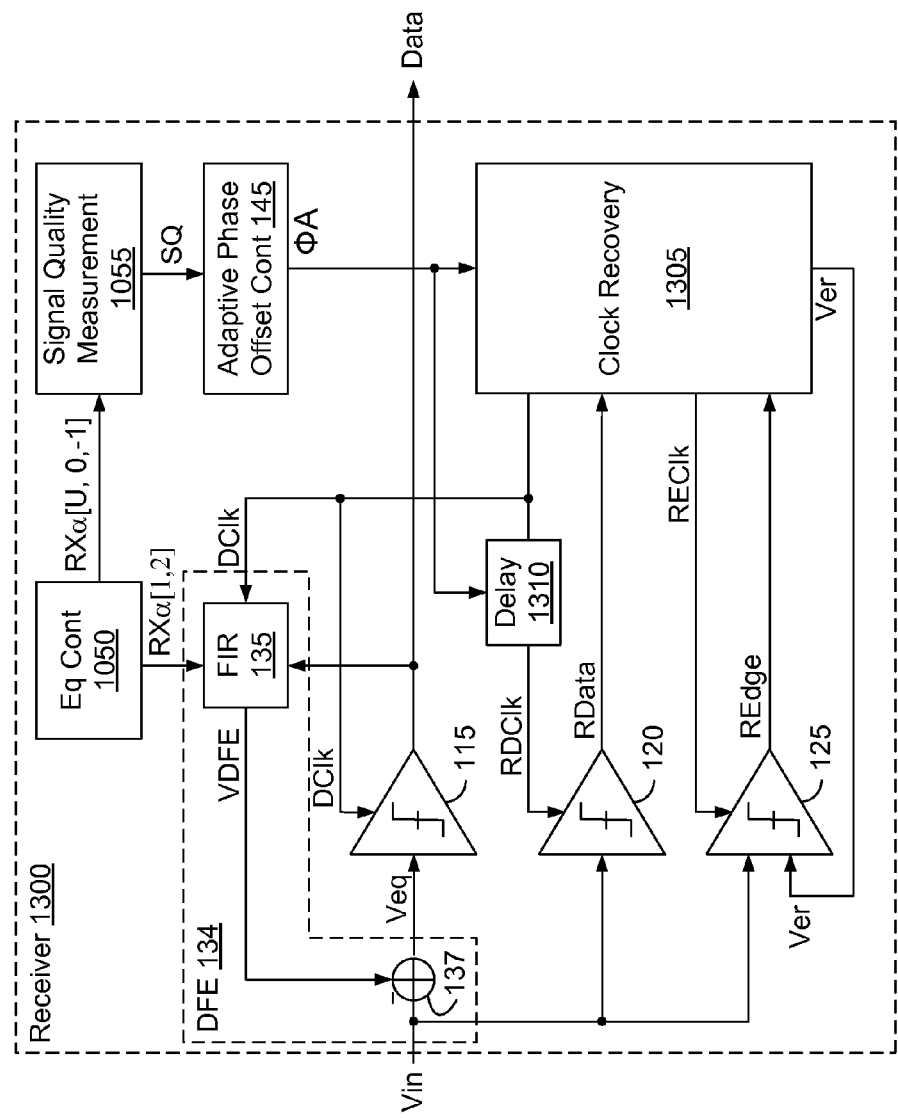
FIG. 13 depicts a receiver 1300 in accordance with another embodiment.

FIG. 13 depicts a receiver 1300 in accordance with another embodiment. Receiver 1300 is similar to receiver 105 of FIG. 1, but is equipped with equalization control circuitry 1050 and signal quality measurement circuitry 1055 of FIG. 10, which together allow receiver 1300 to adapt the timing of sampler 115 and DFE 134 relative to the average edge timing of signal Vin based upon a measure of signal quality that takes into account a measure of postcursor ISI. Edge sampler 125 detects signal transitions (edges) with respect to an edge reference level Ver. Signal transitions to not happen instantaneously, so edge timing can be sensed early or late by varying reference level Ver. In this example clock recovery circuitry 1305 is adapted to vary reference level Ver based upon the value of phase adjust signal ΦA. An optional delay element 1310, or a re-timer, employs phase adjust signal ΦA to maintain reference data clock RDClk centered between the average edge instants of signal Vin. For high-to-low transitions, increasing reference voltage Ver causes REClk to move to an earlier phase, but for low-to-high transitions increasing reference voltage Ver causes REClk to move to a later phase. Clock recovery circuitry 1305 may therefore employ a data filter (not shown) to facilitate pattern-specific adjustments to reference level Ver. In other embodiments delay element 1310 is omitted, or the functionality provided thereby is accomplished inside clock recovery circuitry 1305. With reference to FIG. 7, for example, reference clock RDClk can be phase offset with respect to edge clock REClk by adjusting the signal to adder 786 to some value other than 90°.

Figure 14:
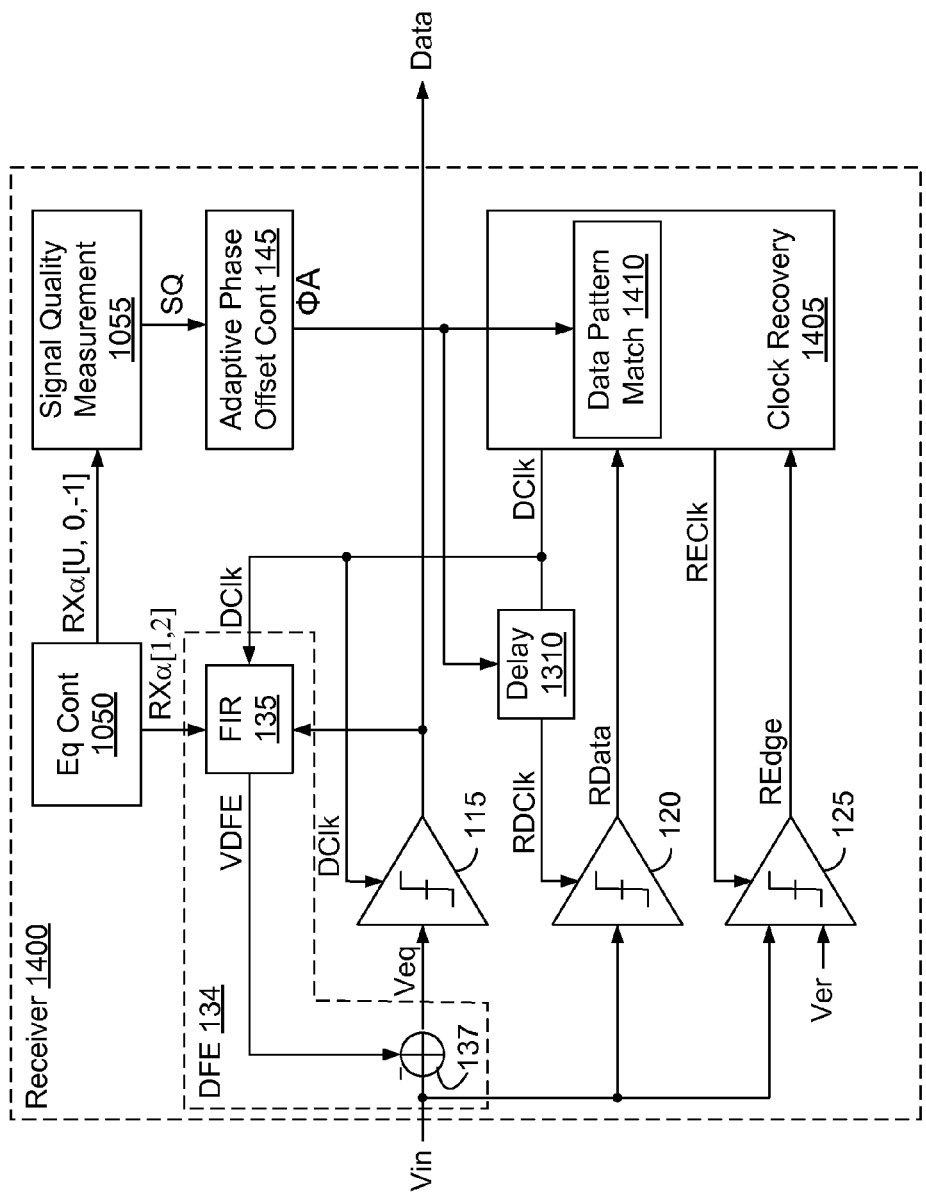
FIG. 14 depicts a receiver 1400 in accordance with another embodiment.

FIG. 14 depicts a receiver 1400 in accordance with yet another embodiment. Receiver 1400 is similar to receiver 1300 of FIG. 13, like-identified elements being the same or similar. Edge sampler 125 detects signal transitions (edges) with respect to a fixed edge reference level Ver in this embodiment. The timing of edge crossings varies with the pattern of the incoming data. For example, a signal transition to a logic-one data level following a stream of logic-zero symbols typically takes longer to cross a given threshold than a signal transition to a logic one following a stream of alternating symbols. The timing of the edge clock signal REClk can therefore be varied relative to the average edge timing of signal Vin by basing the edge sampling on a selected data pattern or patterns. Clock recovery circuitry 1405 of receiver 1400 therefore includes pattern matching logic 1410 that selects one or more desired patterns based upon the value of phase adjust signal ΦA. Other embodiments combine pattern matching with reference-voltage offsetting like that of FIG. 13 to provide additional flexibility.

Figure 15:
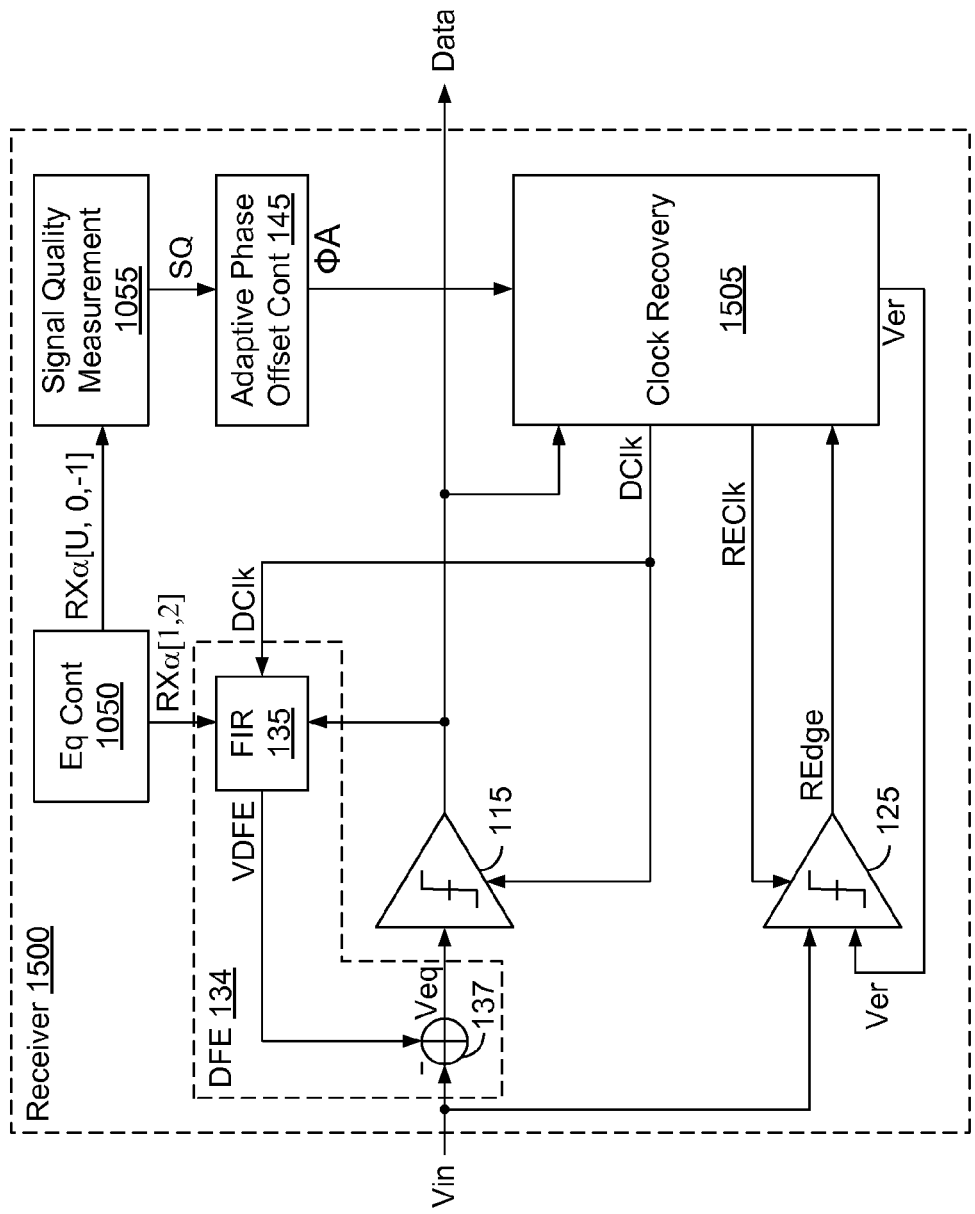
FIG. 15 depicts a receiver 1500 in accordance with another embodiment.

FIG. 15 depicts a receiver 1500 in accordance with yet another embodiment. Receiver 1500 is similar to receiver 1300 of FIG. 13, but omits the reference data sampler. Instead, clock recovery circuitry 1505 extracts a reference edge clock REClk and a data clock DClk common to sampler 115 and DFE 134 using sampled edges REdge and data Data. REClk and DClk may have a fixed phase relationship, such as a constant 90 degree phase offset. Receiver 1500 is equipped with equalization control circuitry 1050 and signal quality measurement circuitry 1055 of FIG. 10, which together allow receiver 1500 to adapt the timing of sampler 115 and DFE 134 relative to the average edge timing of signal Vin based upon a measure of signal quality that takes into account a measure of postcursor ISI. As in the embodiment of FIG. 13, clock recovery circuitry 1505 is adapted to vary reference level Ver based upon the value of phase adjust signal ΦA. Clock recovery circuitry 1305 may employ a data filter (not shown) to facilitate pattern-specific adjustments to reference level Ver for reasons discussed above in connection with FIG. 13.

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. For example, receivers in accordance with other embodiments may include other equalizers instead of or in addition to a DFE, including for example a partial-response DFE, and may be adapted for use with multi-pulse-amplitude-modulated (multi-PAM) signals. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A receiver comprising:
   an equalizer to receive a data signal and issue an equalized signal;
   a reference sampler to sample the data signal before the equalizer to produce reference samples;
   clock recovery circuitry to recover a reference clock signal from the reference samples;
   an adaptive phase-offset controller to receive the recovered reference clock signal and produce a data clock signal phase adjusted with respect to the recovered reference clock signal; and
   a data sampler to sample the equalized signal, after the equalizer and timed to the data clock signal, to produce data samples;
   wherein the reference sampler samples the data signal timed to the recovered reference clock signal.

2. The receiver of claim 1, further comprising a signal quality measurement circuit, coupled to the phase-offset controller, to derive a quality measure from the data samples.

3. The receiver of claim 2, further comprising equalization control circuitry coupled to the signal quality measurement circuit and the equalizer, the control circuitry to adjust the equalizer responsive to the quality measure.

4. The receiver of claim 1, further comprising a second reference sampler to sample the data signal to produce second reference samples.

5. The receiver of claim 4, wherein one of the first reference sampler and the second reference sampler is timed to sample edges of the data signal.

6. The receiver of claim 1, wherein the equalizer includes a feedback path from an output of the data sampler.

7. A method comprising:
   receiving an input signal expressing a series of data symbols;
   equalizing the input signal to produce a series of equalized data symbols;
   sampling the input signal, before the equalizing and timed to a reference clock signal, to produce a series of reference samples;
   sampling the series of equalized data symbols, after the equalizing and timed to a data clock signal, to produce a series of data samples;
   recovering the reference clock signal from the series of reference samples;
   deriving the data clock signal from the reference clock signal; and
   phase adjusting the data clock signal relative to the reference clock signal while sampling the input signal timed to the reference clock signal.

8. The method of claim 7, further comprising deriving a quality measure from the series of data samples and phase adjusting the data clock signal responsive to the quality measure.

9. The method of claim 8, wherein deriving the quality measure comprises considering a bit-error rate of the series of data samples.

10. The method of claim 8, wherein deriving the quality measure comprises measuring precursor intersymbol interference (ISI) for the series of data symbols.

11. The method of claim 10, wherein the ISI is unequalized ISI.

12. The method of claim 7, further comprising phase adjusting the reference clock signal to edges of the series of data symbols.

13. The method of claim 12, further comprising sampling the input signal, timed to a second reference clock signal, to produce a reference data signal.

14. A receiver instantiated on an integrated circuit, the receiver comprising:
   clock recovery circuitry to recover a reference clock signal from an input signal expressing a series of data symbols, the clock recovery circuitry including a reference sampler timed to the reference clock signal;
   a decision-feedback equalizer to produce an equalized signal from the input signal, the decision-feedback equalizer timed to a second clock signal;
   a data sampler to sample the equalized signal to produce a series of data samples; and a controller to phase adjust the second clock signal with respect to the reference clock signal;

wherein the clock recovery circuitry recovers the reference clock signal from the input signal provided to the decision-feedback equalizer.

15. The receiver of claim 14, further comprising a signal quality measurement circuit coupled to the controller, the signal quality measurement circuit to derive a quality measure of the series of data samples, the controller to phase adjust the second clock signal with respect to the reference clock signal responsive to the quality measure.

16. The receiver of claim 15, wherein the second clock signal is a data clock signal, and wherein the data sampler samples the equalized signal timed to the data clock signal.

17. The receiver of claim 14, the data sampler to sample the equalized signal timed to a third clock signal, the controller to phase adjust the third clock signal with respect to the reference clock signal.

18. The receiver of claim 17, wherein the controller independently phase adjusts the second and third clock signals with respect to the reference clock signal.

19. The receiver of claim 18, further comprising first and second phase interpolators to independently adjust the second and third clock signals.

* * * * *